US011358490B2

(12) United States Patent
Nakamura et al.

(10) Patent No.: US 11,358,490 B2
(45) Date of Patent: Jun. 14, 2022

(54) POWER FEED SYSTEM

(71) Applicant: Toyota Jidosha Kabushiki Kaisha, Toyota (JP)

(72) Inventors: Toru Nakamura, Toyota (JP); Hidetoshi Kusumi, Nagoya (JP); Shigeki Kinomura, Toyota (JP); Yoshiyuki Tsuchiya, Hamamatsu (JP); Hironobu Kitaoka, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/069,536

(22) Filed: Oct. 13, 2020

(65) Prior Publication Data

US 2021/0107373 A1    Apr. 15, 2021

(30) Foreign Application Priority Data

Oct. 15, 2019  (JP) .............................. JP2019-188823

(51) Int. Cl.
*B60L 55/00*   (2019.01)
*B60L 53/14*   (2019.01)

(52) U.S. Cl.
CPC .............. *B60L 55/00* (2019.02); *B60L 53/14* (2019.02)

(58) Field of Classification Search
CPC ..................................................... B60L 55/00
USPC ......................................................... 307/10.1
See application file for complete search history.

(56) References Cited

U.S. PATENT DOCUMENTS

| 5,049,802 | A  | 9/1991 | Mintus et al. |
| 8,504,227 | B2 | 8/2013 | Ichishi |
| 8,509,976 | B2 | 8/2013 | Kempton |
| 8,676,401 | B2 | 3/2014 | Asada et al. |
| 8,766,595 | B2 | 7/2014 | Gaul et al. |
| 8,803,485 | B2 | 8/2014 | Chuang et al. |
| 9,168,841 | B2 | 10/2015 | Kawai et al. |

(Continued)

FOREIGN PATENT DOCUMENTS

| JP | 2009-183086 A | 8/2009 |
| JP | 2011-199953 A | 10/2011 |

(Continued)

OTHER PUBLICATIONS

Office Action issued in U.S. Appl. No. 16/998,227 dated Jun. 30, 2021.

(Continued)

*Primary Examiner* — Joseph Chang
(74) *Attorney, Agent, or Firm* — Dinsmore & Shohl LLP

(57) ABSTRACT

A power feed system includes a power feed controller that controls a plurality of vehicles including a first vehicle and a second vehicle to successively carry out external power feed in a relayed manner. In passing on external power feed in the relayed manner from the first vehicle to the second vehicle, the power feed controller controls the first vehicle and the second vehicle to make transition from external power feed by the first vehicle to external power feed by the second vehicle with an overlapping period being interposed. During the overlapping period, both of the first vehicle and the second vehicle simultaneously carry out external power feed. The power feed controller controls at least one of the first vehicle and the second vehicle to set total electric power to target electric power during the overlapping period.

16 Claims, 15 Drawing Sheets

(56) References Cited

U.S. PATENT DOCUMENTS

| | | |
|---|---|---|
| 9,457,682 B2 | 10/2016 | Twarog et al. |
| 9,550,430 B2 * | 1/2017 | Toggenburger ....... H02J 7/0027 |
| 9,566,873 B2 | 2/2017 | Chauhdary et al. |
| 9,954,361 B2 | 4/2018 | Covic et al. |
| 10,620,679 B2 | 4/2020 | Sultenfuss et al. |
| 10,926,659 B2 | 2/2021 | Lee et al. |
| 2011/0193522 A1 | 8/2011 | Uesugi |
| 2013/0278225 A1* | 10/2013 | Dietze .................. B60L 53/665 |
| | | 320/137 |
| 2014/0143002 A1 | 5/2014 | Aisu |
| 2015/0102775 A1* | 4/2015 | Von Novak, III ...... B60L 53/14 |
| | | 320/109 |
| 2015/0165917 A1* | 6/2015 | Robers ................... B60L 53/68 |
| | | 320/109 |
| 2018/0241229 A1 | 8/2018 | Kitaoka et al. |
| 2020/0231058 A1* | 7/2020 | Hishida ................... H02J 7/007 |
| 2020/0271471 A1 | 8/2020 | Kim et al. |
| 2020/0369175 A1 | 11/2020 | Rajabally et al. |
| 2020/0386561 A1 | 12/2020 | Namiki |
| 2021/0016675 A1 | 1/2021 | Jefferies et al. |
| 2021/0053459 A1* | 2/2021 | Tsuchiya ................ B60L 58/12 |
| 2021/0129689 A1* | 5/2021 | Nakamura ............. B60L 53/62 |

FOREIGN PATENT DOCUMENTS

| | | |
|---|---|---|
| JP | 2013-223310 A | 10/2013 |
| JP | 2017-070211 A | 4/2017 |
| JP | 2017-093177 A | 5/2017 |
| JP | 2017-139961 A | 8/2017 |
| JP | 2018-137886 A | 8/2018 |

OTHER PUBLICATIONS

Final Office Action received in U.S. Appl. No. 16/998,227 dated Oct. 8, 2021.

* cited by examiner

POWER FEED SYSTEM

CROSS REFERENCE TO RELATED APPLICATIONS

This nonprovisional application claims priority to Japanese Patent Application No. 2019-188823 filed with the Japan Patent Office on Oct. 15, 2019, the entire contents of which are hereby incorporated by reference.

BACKGROUND

Field

The present disclosure relates to a power feed system and particularly to a technique with which a plurality of vehicles included in a power feed system successively carry out external power feed.

Description of the Background Art

Japanese Patent Laying-Open No. 2009-183086 discloses a power feed system that determines, in electric power supply from a plurality of vehicle-mounted storage batteries to a power grid, whether electric power supply is excessive or insufficient based on calculation of total electric power supplied from all supply sources and stops or starts electric power supply from the vehicle-mounted storage batteries to the power grid in accordance with determined excess or insufficiency.

SUMMARY

In order to shorten a time period for which each vehicle included in a power feed system is retained, a power feed method with which a plurality of vehicles successively carry out external power feed in a relayed manner (which is also referred to as "relayed power feed" below) may be adopted. With such a method, vehicles continuously carry out external power feed with the vehicles that carry out external power feed being switched, and hence the time period for which each vehicle is retained is shorter. External power feed refers to feed of electric power stored in a power storage provided in a vehicle to the outside of the vehicle.

When timing of end of external power feed by the first vehicle deviates from timing of start of external power feed by the second vehicle, however, desired electric power cannot be fed by the first vehicle and the second vehicle. For example, there may be discontinuity in power feed (that is, a period during which neither of the vehicles carries out external power feed) between end of external power feed by an earlier vehicle (that is, a first vehicle) and start of external power feed by a next vehicle (that is, a second vehicle).

The present disclosure was made to solve the problem above, and an object thereof is to provide a power feed system in which feed of desired electric power is facilitated by using a power feed method (that is, relayed power feed) in which a plurality of vehicles carry out external power feed successively in a relayed manner.

A power feed system according to the present disclosure includes a plurality of vehicles each including a power storage that is externally power feedable and a power feed controller that controls the plurality of vehicles to successively carry out external power feed in a relayed manner. The plurality of vehicles include a first vehicle and a second vehicle. In passing on external power feed in the relayed manner from the first vehicle to the second vehicle, the power feed controller controls the first vehicle and the second vehicle to make transition from external power feed by the first vehicle to external power feed by the second vehicle with an overlapping period being interposed. The overlapping period is a period during which both of the first vehicle and the second vehicle simultaneously carry out external power feed. The power feed controller controls at least one of the first vehicle and the second vehicle to set a sum of electric power fed from the first vehicle and electric power fed from the second vehicle (which is also referred to as "total electric power" below) to target electric power during the overlapping period.

In the power feed system, both of the first vehicle and the second vehicle simultaneously carry out external power feed during the overlapping period. Therefore, discontinuity of power feed does not occur in relay from the first vehicle to the second vehicle and external power feed by the first vehicle and the second vehicle is continuously carried out. Since total electric power (that is, the sum of electric power fed from the first vehicle and electric power fed from the second vehicle) is controlled to target electric power during the overlapping period, excess or insufficiency of total electric power is suppressed. The power feed system thus readily feeds desired electric power by relayed power feed.

In passing on external power feed in the relayed manner from the first vehicle to the second vehicle, the power feed controller may decrease electric power fed from the first vehicle at a first rate and increase electric power fed from the second vehicle at a second rate. Each of the first rate and the second rate may be equal to or lower than 3 kW/second on average from start until end of the overlapping period.

In the power feed system, feed power of the first vehicle gradually falls and feed power of the second vehicle gradually rises. Therefore, fluctuation in total electric power due to relative deviation between timing of fall of feed power of the first vehicle and timing of rise of feed power of the second vehicle is lessened. According to such a configuration, significant deviation of total electric power from target electric power due to deviation in power feed timing can be suppressed.

Each of the first rate and the second rate may be not lower than 0.1 kW/second and not higher than 3 kW/second or may be not lower than 0.1 kW/second and not higher than 1 kW/second on average from start until end of the overlapping period.

When external power feed in the relayed manner by the first vehicle and the second vehicle does not proceed as scheduled, the power feed controller may control a third vehicle to carry out external power feed.

In the power feed system, when relayed power feed does not proceed as scheduled, the third vehicle carries out external power feed. According to such a configuration, even though an unexpected situation happens, desired electric power can be fed based on relayed power feed. The third vehicle may carry out external power feed instead of the first vehicle or the second vehicle or may carry out external power feed together with the first vehicle or the second vehicle. The power feed controller may control the third vehicle such that the sum of electric power fed from the third vehicle and electric power fed from a vehicle (for example, the first vehicle or the second vehicle) that carries out external power feed together with the third vehicle attains to target electric power.

When an unexpected situation happens, feed power may also be adjusted by external power feed by the first vehicle continued longer than scheduled or by start of external power feed by the second vehicle earlier than scheduled.

When the unexpected situation happens, however, the first vehicle and the second vehicle are not always ready for unscheduled external power feed. When the third vehicle stands by in preparation for an unexpected situation, the third vehicle can carry out external power feed instead of the first vehicle or the second vehicle. By external power feed by the third vehicle, upset of a power feed schedule as a whole in relayed power feed can be suppressed. For example, as the third vehicle carries out external power feed instead of the first vehicle when the first vehicle is unable to carry out scheduled external power feed, a vehicle (that is, the second vehicle and subsequent vehicles) that follows the first vehicle can carry out external power feed as scheduled.

When target electric power increases during external power feed by the first vehicle or the second vehicle alone and feed power of the first vehicle or the second vehicle alone is insufficient to achieve target electric power, the third vehicle may carry out external power feed together with the first vehicle or the second vehicle.

When the first vehicle quits external power feed earlier than scheduled, the power feed controller may pass on external power feed in the relayed manner from the first vehicle to the third vehicle and then to the second vehicle, by controlling the third vehicle to carry out external power feed.

In the power feed system, when the first vehicle quits external power feed earlier than scheduled, the third vehicle carries out external power feed instead of the first vehicle. Power feed in the relayed manner is passed on from the first vehicle to the third vehicle and then to the second vehicle. When the first vehicle quits external power feed earlier than scheduled, feed power can be compensated for by the third vehicle and hence the power feed system readily feeds desired electric power.

Any power feed system described above may include an input apparatus that accepts an operation from a user. When the user performs a prescribed operation onto the input apparatus while the first vehicle is carrying out external power feed, the first vehicle may transmit a prescribed signal (which is also referred to as a "stop prediction signal" below) to the power feed controller and thereafter stop external power feed that the first vehicle is carrying out. When the power feed controller receives the stop prediction signal from the first vehicle, the power feed controller may start external power feed by the third vehicle before external power feed that is being carried out by the first vehicle is stopped.

The power feed system senses end of external power feed by the first vehicle earlier than scheduled by means of the input apparatus, and starts external power feed by the third vehicle before external power feed that is being carried out by the first vehicle is stopped. When the first vehicle quits external power feed earlier than scheduled, feed power can be compensated for by the third vehicle and hence the power feed system readily feeds desired electric power. The input apparatus may be mounted on the first vehicle or on a stationary facility.

When the first vehicle quits external power feed earlier than scheduled, the power feed controller may pass on external power feed in the relayed manner from the first vehicle to the second vehicle with the overlapping period being interposed, by starting external power feed by the second vehicle earlier than scheduled.

In the power feed system, when the first vehicle quits external power feed earlier than scheduled, external power feed by the second vehicle is started earlier than scheduled. When the first vehicle quits external power feed earlier than scheduled, feed power can be compensated for by the second vehicle and hence the power feed system readily feeds desired electric power. Since feed power is adjusted by the second vehicle, the third vehicle does not have to stand by.

The power feed controller may control a length of the overlapping period based on a time period (which is also referred to as a "communication delay time period" below) required for the power feed controller to communicate with each of the first vehicle and the second vehicle.

Since the first vehicle and the second vehicle carry out external power feed in accordance with an instruction from the power feed controller, timing of start or end of external power feed by each vehicle may vary depending on the communication delay time period. Fluctuation in total electric power due to relative deviation between timing of fall of feed power of the first vehicle and timing of rise of feed power of the second vehicle can be lessened by changing a length of the overlapping period. According to such a configuration, significant deviation of total electric power from target electric power due to deviation in power feed timing can be suppressed.

When the power feed controller senses difference of the total electric power from the target electric power during the overlapping period, the power feed controller may change feed power of at least one of the first vehicle and the second vehicle to set the total electric power to the target electric power.

When the power feed system senses difference of total electric power from target electric power during the overlapping period, the power feed system can control total electric power to target electric power by changing feed power of at least one of the first vehicle and the second vehicle.

Any power feed system described above may further include a power grid that is electrically connectable to each of the plurality of vehicles. Electric power output from each of the plurality of vehicles by external power feed in the relayed manner may be supplied to the power grid. While the power feed controller is carrying out external power feed in the relayed manner, the power feed controller may control at least one of the plurality of vehicles to set electric power supplied to the power grid to the target electric power.

The power feed system can balance between supply and demand of electric power in the power grid by controlling electric power supplied to the power grid by relayed power feed to target electric power.

Each of the plurality of vehicles controlled by the power feed controller may be an electrically powered vehicle. The electrically powered vehicle refers to a vehicle that travels with electric power stored in a power storage. Examples of the electrically powered vehicle include an electric vehicle (EV), a hybrid vehicle (HV), and a plug-in hybrid vehicle (PHV) as well as a fuel cell vehicle (FCV) and a range extender EV.

The foregoing and other objects, features, aspects and advantages of the present disclosure will become more apparent from the following detailed description of the present disclosure when taken in conjunction with the accompanying drawings.

DETAILED DESCRIPTION

Figure 1:
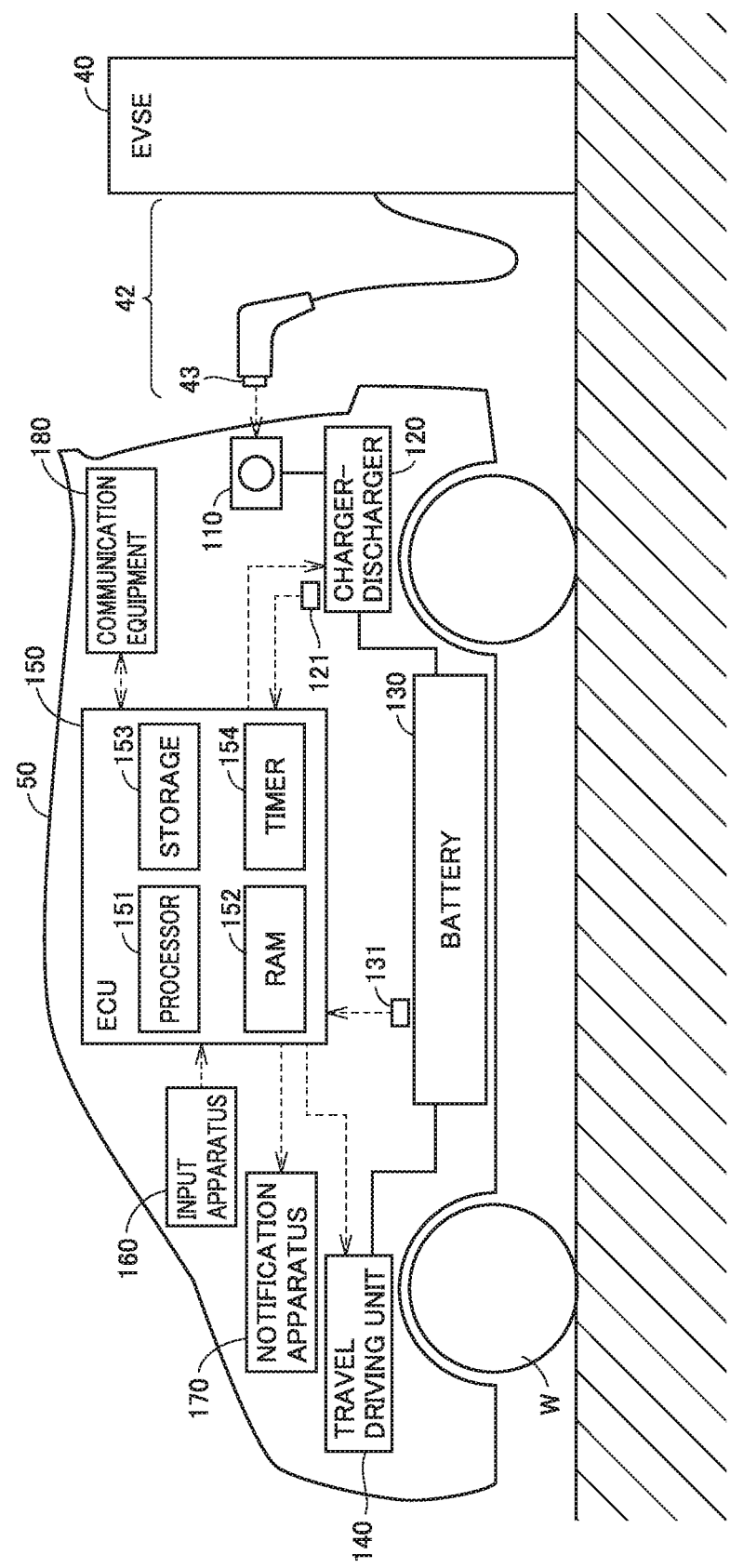
FIG. 1 is a diagram showing a configuration of a vehicle according to an embodiment of the present disclosure.

An embodiment of the present disclosure will be described below in detail with reference to the drawings. The same or corresponding elements in the drawings have the same reference characters allotted and description thereof will not be repeated.

A power feed system according to this embodiment includes a plurality of vehicles. Though the plurality of vehicles in the power feed system may be different from one another in configuration, they are identical in configuration in this embodiment. Each of a plurality of vehicles included in the power feed system is denoted as a "vehicle 50" below and each of a plurality of pieces of EVSE included in the power feed system is denoted as "EVSE 40" below, unless they are described as being distinguished from one another. EVSE means electric vehicle supply equipment.

FIG. 1 is a diagram showing a configuration of a vehicle according to this embodiment. Referring to FIG. 1, vehicle 50 includes a battery 130 that stores electric power for traveling. Battery 130 includes a secondary battery such as a lithium ion battery or a nickel metal hydride battery. In this embodiment, a battery assembly including a plurality of lithium ion batteries is adopted as the secondary battery. The battery assembly is composed of a plurality of cells electrically connected to one another. Instead of the secondary battery, another power storage such as an electric double layer capacitor may be adopted. Battery 130 according to this embodiment corresponds to an exemplary "power storage" according to the present disclosure.

Vehicle 50 includes an electronic control unit (which is referred to as an "ECU" below) 150. ECU 150 carries out charging control and discharging control of battery 130. ECU 150 controls communication with the outside of vehicle 50. Vehicle 50 further includes a monitoring module 131 that monitors a state of battery 130. Monitoring module 131 includes various sensors that detect a state (for example, a voltage, a current, and a temperature) of battery 130 and outputs a result of detection to ECU 150. ECU 150 can obtain a state (for example, a temperature, a current, a voltage, a state of charge (SOC), and an internal resistance) of battery 130 based on an output (that is, detection values from various sensors) from monitoring module 131. Vehicle 50 may be an electric vehicle (EV) that can travel only with electric power stored in battery 130 or a plug-in hybrid vehicle (PHV) that can travel with both of electric power stored in battery 130 and output from an engine (not shown).

Vehicle 50 includes an inlet 110 and a charger-discharger 120 adapted to a power feed type of EVSE 40. Inlet 110 receives electric power supplied from the outside of vehicle 50. Inlet 110 outputs electric power supplied from charger-discharger 120 to the outside of vehicle 50. Though FIG. 1 shows only inlet 110 and charger-discharger 120, vehicle 50 may include an inlet and a charger-discharger for each power feed type so as to adapt to a plurality of power feed types (for example, an alternating-current (AC) type and a direct-current (DC) type).

A charging cable 42 is connected to EVSE 40. Charging cable 42 may always be connected to EVSE 40 or may be attachable to and removable from EVSE 40. Charging cable 42 includes a connector 43 at its tip end and contains a power line. Connector 43 of charging cable 42 can be connected to inlet 110. As connector 43 of charging cable 42 connected to EVSE 40 is connected to inlet 110 of vehicle 50, EVSE 40 and vehicle 50 are electrically connected to each other. Electric power can thus be supplied from EVSE 40 through charging cable 42 to vehicle 50.

Charger-discharger 120 is located between inlet 110 and battery 130. Charger-discharger 120 includes a relay that switches between connection and disconnection of an electric power path from inlet 110 to battery 130 and a power conversion circuit (neither of which is shown). For example, a bidirectional converter can be adopted as the power conversion circuit. Each of the relay and the power conversion circuit included in charger-discharger 120 is controlled by ECU 150. Vehicle 50 further includes a monitoring module 121 that monitors a state of charger-discharger 120. Monitoring module 121 includes various sensors that detect a state (for example, a voltage, a current, and a temperature) of charger-discharger 120 and outputs a result of detection to ECU 150. In this embodiment, monitoring module 121 detects a voltage and a current input to and output from the power conversion circuit.

As EVSE 40 outside vehicle 50 and inlet 110 are connected to each other through charging cable 42, electric power can be supplied and received between EVSE 40 and vehicle 50. Therefore, external charging by vehicle 50 can be carried out (that is, electric power can be supplied from the outside of vehicle 50 to charge battery 130 of vehicle 50). Electric power for external charging is supplied, for example, from EVSE 40 through charging cable 42 to inlet 110. Charger-discharger 120 converts electric power received at inlet 110 into electric power suitable for charging of battery 130 and outputs resultant electric power to battery 130. As EVSE 40 and inlet 110 are connected to each other through charging cable 42, external power feed by vehicle 50 (that is, power feed from vehicle 50 through charging cable 42 to EVSE 40) can be carried out. Electric power for external power feed is supplied from battery 130 to charger-discharger 120. Charger-discharger 120 converts electric power supplied from battery 130 into electric power suitable for external power feed and outputs resultant electric power to inlet 110. When any of external charging and external power feed is performed, the relay of charger-discharger 120 is closed (connected), and when neither of external charging and external power feed is performed, the relay of charger-discharger 120 is opened (disconnected).

The configuration of charger-discharger 120 is not limited as above and can be modified as appropriate. Charger-discharger 120 may include, for example, at least one of a rectification circuit, a power factor correction (PFC) circuit, an insulating circuit (for example, an insulating transformer), an inverter, and a filter circuit. When vehicle 50 carries out external power feed to AC type EVSE, charger-discharger 120 may subject electric power discharged from battery 130 to DC/AC conversion and resultant AC power may be supplied from vehicle 50 to the EVSE. When vehicle 50 carries out external power feed to DC type EVSE, vehicle 50 may supply DC power to the EVSE and an inverter contained in the EVSE may carry out DC/AC conversion. Standards of the DC type EVSE may be any of CHAdeMO, Combined Charging System (CCS), GB/T, and Tesla.

ECU 150 includes a processor 151, a random access memory (RAM) 152, a storage 153, and a timer 154. For example, a central processing unit (CPU) can be adopted as processor 151. RAM 152 functions as a work memory that temporarily stores data to be processed by processor 151. Storage 153 can store information that is put thereinto. Storage 153 includes, for example, a read only memory (ROM) and a rewritable non-volatile memory. Storage 153 stores not only a program but also information (for example, a map, a mathematical expression, and various parameters) to be used by a program. As a program stored in storage 153 is executed by processor 151, various types of control by ECU 150 are carried out in this embodiment. Various types of control by ECU 150 are not limited to control carried out by software but can also be carried out by dedicated hardware (electronic circuitry). Any number of processors may be provided in ECU 150 and a processor may be prepared for each prescribed type of control.

Timer 154 notifies processor 151 that the set time has come. As the time set in timer 154 comes, timer 154 transmits a signal to that effect to processor 151. In this embodiment, a timer circuit is adopted as timer 154. Timer 154 may be implemented by software instead of hardware (timer circuitry). ECU 150 can obtain current time from a real time clock (RTC) circuit (not shown) contained in ECU 150.

Vehicle 50 further includes a travel driving unit 140, an input apparatus 160, a notification apparatus 170, communication equipment 180, and a drive wheel W. Vehicle 50 is not limited to a front-wheel-drive vehicle shown in FIG. 1 and it may be a rear-wheel-drive vehicle or a four-wheel-drive vehicle.

Travel driving unit 140 includes a not-shown power control unit (PCU) and a motor generator (MG), and allows vehicle 50 to travel with electric power stored in battery 130. The PCU includes, for example, a controller including a processor, an inverter, a converter, and a relay (which is referred to as a "system main relay (SMR)" below) (none of which is shown). The controller of the PCU receives an instruction (a control signal) from ECU 150 and controls the inverter, the converter, and the SMR of the PCU in accordance with the instruction. The MG is implemented, for example, by a three-phase AC motor generator. The MG is driven by the PCU and rotates drive wheel W. The MG performs regeneration and supplies regenerated electric power to battery 130. The SMR switches between connection and disconnection of an electric power path from battery 130 to the PCU. The SMR is closed (connected) when vehicle 50 travels.

Input apparatus 160 accepts an input from a user. Input apparatus 160 is operated by a user and outputs a signal corresponding to the operation by the user to ECU 150. Communication may be wired or wireless. Examples of input apparatus 160 include various switches, various pointing devices, a keyboard, and a touch panel. An operation portion of a car navigation system may be adopted as input apparatus 160. A smart speaker that accepts audio input may be adopted as input apparatus 160.

Notification apparatus 170 performs prescribed processing for giving a notification to a user (for example, a driver and/or a passenger of vehicle 50) when a request is given from ECU 150. Notification apparatus 170 may include at least one of a display apparatus (for example, a touch panel display), a speaker (for example, a smart speaker), and a lamp (for example, a malfunction indicator lamp (MIL)). Notification apparatus 170 may be implemented by a meter panel, a head-up display, or a car navigation system.

Communication equipment 180 includes various communication interfaces (I/F). Communication equipment 180 may include a data communication module (DCM). ECU 150 wirelessly communicates with a communication apparatus outside vehicle 50 through communication equipment 180.

An electric power system dependent on a large-scale power plant (an intensive energy resource) possessed by an electric power utility company has recently been reviewed and a scheme for utilizing an energy resource possessed by each demand side (which is also referred to as "demand side resources (DSR)" below) has been constructed. The DSR functions as distributed energy resources (which are also referred to as "DER" below).

A virtual power plant (VPP) has been proposed as a scheme for utilizing the DSR for an electric power system. The VPP refers to a scheme in which a large number of DER (for example, DSR) are put together according to a sophisticated energy management technology that makes use of the Internet of Things (IoT) and the DER are remotely controlled as being integrated as if the DER functioned as a single power plant. In the VPP, an electric utility that puts the DER together to provide an energy management service is referred to as an "aggregator." An electric power utility company, for example, in coordination with an aggregator, can balance between supply and demand of electric power based on demand response (which is also referred to as "DR" below).

DR is an approach to balancing between supply and demand of electric power by issuing a prescribed request to each demand side by using a demand response signal (which is also referred to as a "DR signal" below). The DR signal is broadly categorized into two types of a DR signal that requests suppression of power demand or backfeeding (which is also referred to as a "DR suppression signal" below) and a DR signal that requests increase in power demand (which is also referred to as a "DR increase signal" below).

A vehicle grid integration (VGI) system is adopted as the power feed system according to this embodiment. In the VGI system, an electrically powered vehicle (that is, vehicle 50 described above) including a power storage is adopted as DSR for realizing VPP.

Figure 2:
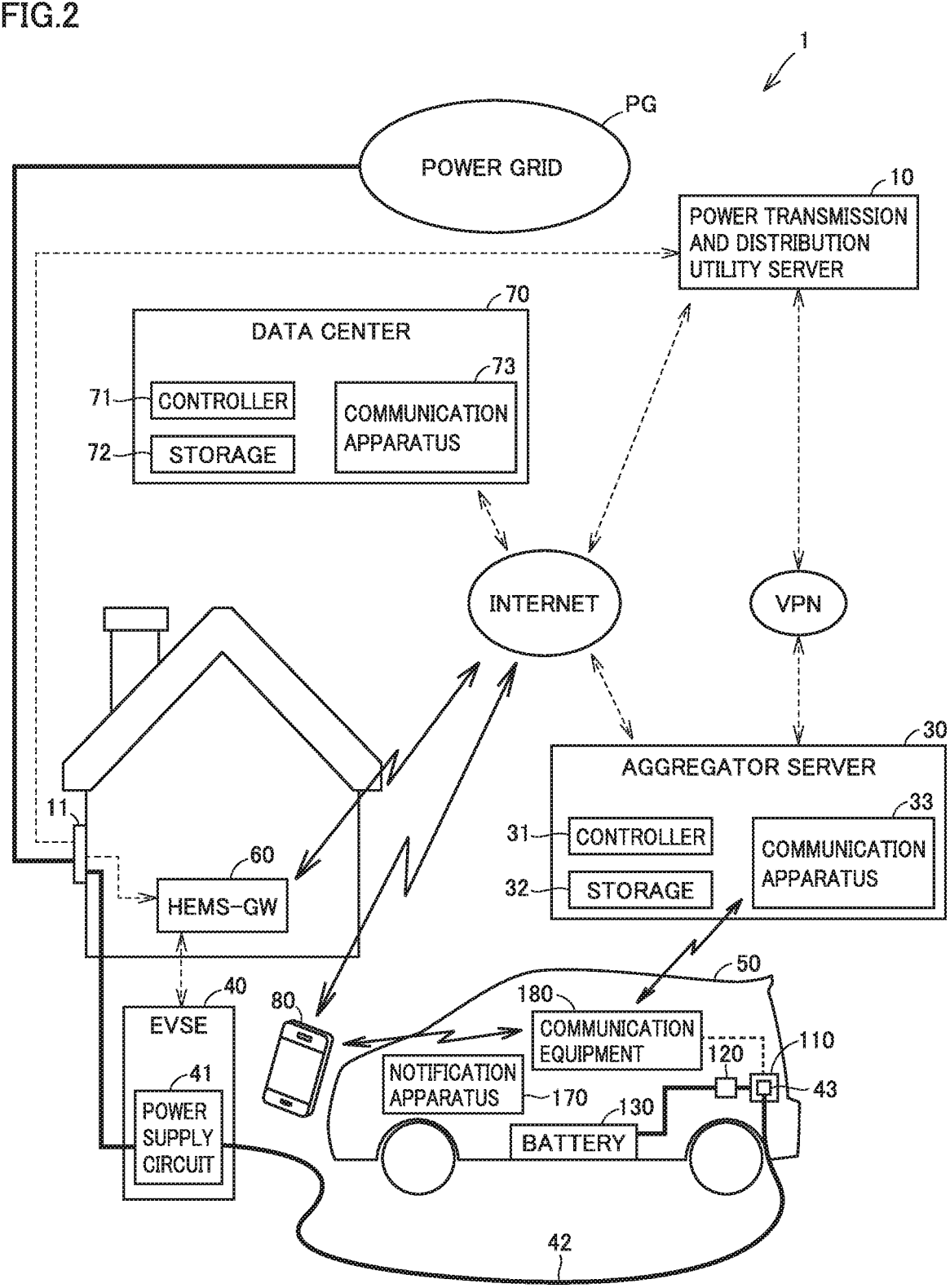
FIG. 2 is a diagram showing a schematic configuration of a power feed system according to the embodiment of the present disclosure.

FIG. 2 is a diagram showing a schematic configuration of the power feed system according to this embodiment. A VGI system 1 shown in FIG. 2 corresponds to an exemplary "power feed system" according to the present disclosure. Though FIG. 2 shows only one of each of the vehicle, the EVSE, and an aggregator server, VGI system 1 includes a plurality of vehicles, a plurality of pieces of EVSE, and a plurality of aggregator servers. Any independent number of vehicles, pieces of EVSE, and aggregator servers may be included in VGI system 1, and the number may be set to ten or more or one hundred or more. Each vehicle included in VGI system 1 may be a personally owned vehicle (POV) or a vehicle managed by a mobility as a service (MaaS) entity (MaaS vehicle). Though FIG. 2 shows only a single portable terminal, the portable terminal is carried by each user of the vehicle. Though FIG. 2 illustrates home EVSE, VGI system 1 may include public EVSE that can be used by a large number of unspecified users.

Referring to FIG. 2, VGI system 1 includes a power transmission and distribution utility server 10 (which is also simply referred to as a "server 10" below), a smart meter 11, an aggregator server 30 (which is also simply referred to as a "server 30" below), EVSE 40, vehicle 50 (see FIG. 1), a home energy management system-gateway (HEMS-GW) 60, a data center 70, a portable terminal 80, and a power grid PG. In this embodiment, a smartphone equipped with a touch panel display is adopted as portable terminal 80. Without being limited thereto, any portable terminal can be adopted as portable terminal 80, and a tablet terminal, a wearable device (for example, a smart watch), an electronic key, or a service tool can also be adopted.

Server 10 belongs to a power transmission and distribution utility. In this embodiment, an electric power utility company serves also as a power generation utility and a power transmission and distribution utility. The electric power utility company constructs a power network (that is, power grid PG) with a power plant and a power transmission and distribution facility which are not shown, and maintains and manages server 10, smart meter 11, EVSE 40, HEMS-GW 60, and power grid PG. Power grid PG according to this embodiment corresponds to an exemplary "power grid" according to the present disclosure. In this embodiment, the electric power utility company corresponds to a system operator that operates power grid PG.

The electric power utility company can make a profit, for example, by dealing with a demand side (for example, an individual or a company) that uses electric power. The electric power utility company provides each demand side with a smart meter. For example, a user of vehicle 50 shown in FIG. 2 is provided with smart meter 11. Identification information (which is also referred to as a "meter ID" below) for identification of each smart meter is provided for each smart meter, and server 10 manages a value of measurement by each smart meter as being distinguished based on the meter ID. The electric power utility company can know an amount of power usage for each demand side based on a value of measurement by each smart meter.

In VGI system 1, identification information (ID) for identification among a plurality of aggregators is provided for each aggregator. Server 10 manages information for each aggregator as being distinguished based on the ID of the aggregator. The aggregator provides an energy management service by putting together amounts of electric power controlled by demand sides under the control thereof. The aggregator can control the amount of electric power by requesting each demand side to level electric power by using a DR signal.

Server 30 belongs to an aggregator. Server 30 includes a controller 31, a storage 32, and a communication apparatus 33. Details of the configuration of server 30 will be described later. In VGI system 1, an electrically powered vehicle (for example, a POV or a MaaS vehicle) is adopted as DSR managed by the aggregator (and server 30). A demand side can control an amount of electric power by means of the electrically powered vehicle. The aggregator may procure capacity (capability of supply of electricity) not only from vehicle 50 but also from a resource other than vehicle 50 (for example, a vending machine, a plant factory, or biomass). The aggregator can make a profit, for example, by dealing with an electric power utility company. The aggregator may be divided into an upper aggregator that contacts a power transmission and distribution utility (for example, the electric power utility company) and a lower aggregator that contacts a demand side.

Data center 70 includes a controller 71, a storage 72, and a communication apparatus 73. Controller 71 includes a processor, performs prescribed information processing, and controls communication apparatus 73. Storage 72 can store various types of information. Communication apparatus 73 includes various types of communication interfaces (I/F). Controller 71 communicates with the outside through communication apparatus 73. Data center 70 manages information on a plurality of registered portable terminals (including portable terminals 80). Information on the portable terminal includes not only information on the terminal itself (for example, a communication address of the portable terminal) but also information on a user who carries the portable terminal (for example, a vehicle ID of vehicle 50 belonging to the user). Identification information for identification of the portable terminal (which is also referred to as a "terminal ID" below) is provided for each portable terminal and data center 70 manages information for each portable terminal as being distinguished based on the terminal ID. The terminal ID also functions as information for identification of a user (a user ID).

Prescribed application software (which is simply referred to as an "application" below) is installed in portable terminal 80, and portable terminal 80 exchanges information with each of server 30, HEMS-GW 60 and data center 70 through the application. Portable terminal 80 wirelessly communicates with each of server 30, HEMS-GW 60 and data center 70, for example, through the Internet. A user can transmit information representing a state and a schedule of the user to data center 70 by operating portable terminal 80. Exemplary information representing a state of the user includes information indicating whether or not the user is in a condition of being ready for addressing DR. Exemplary information representing the schedule of the user includes time of departure of a POV from home or a drive plan of a MaaS vehicle. Each of server 30 and data center 70 stores the information received from portable terminal 80 as being distinguished for each terminal ID.

Server 10 and server 30 can communicate with each other, for example, through a virtual private network (VPN). A protocol of communication between server 10 and server 30 may be OpenADR. Server 30 and data center 70 can communicate with each other, for example, through the Internet. A protocol of communication between server 30 and data center 70 may be OpenADR. Server 30 can obtain information on a user from data center 70. Each of server 30 and data center 70 can communicate with HEMS-GW 60, for example, through the Internet. A protocol of communication between each of server 30 and data center 70 and HEMS-GW 60 may be OpenADR.

Though server 30 and EVSE 40 do not communicate with each other in this embodiment, server 30 and EVSE 40 may communicate with each other. Server 30 may communicate with vehicle 50 with EVSE 40 being interposed. EVSE 40 may communicate with an EVSE management cloud. A protocol of communication between EVSE 40 and the EVSE management cloud may be open charge point protocol (OCPP).

Server 30 sequentially obtains from each vehicle 50, information representing a state or schedule of each vehicle 50 (for example, a position of the vehicle, a state of connection of the charging cable, a state of the battery, a charging schedule, a condition for charging, a power feed schedule, a condition for power feed, a schedule of travel, and a condition for travel) under the control thereof and stores the information. The state of connection of the charging cable is information on whether or not connector 43 of charging cable 42 is connected to inlet 110. The state of the battery is information on a value of an SOC of battery 130 and information indicating whether or not battery 130 is being charged. The charging schedule is information indicating time of start and end of scheduled external charging. The condition for charging may be a condition for scheduled external charging (for example, charging power) or a condition for external charging that is currently ongoing (for example, charging power and a remaining time period of charging). The power feed schedule is information indicating time of start and end of scheduled external power feed. The condition for power feed may be a condition for scheduled external power feed (for example, feed power) or a condition for external power feed that is currently ongoing (for example, feed power and a remaining time period for power feed). The schedule of travel is information indicating time of start and end of scheduled travel. The condition for travel may be a condition for scheduled travel (for example, a travel route and a travel distance) or a condition for travel that is currently ongoing (for example, a traveling speed and a remaining distance of travel).

Server 10 levels electric power by using demand response (DR). When server 10 levels electric power, initially, the server transmits a signal (which is also referred to as a "DR participation request" below) requesting participation into DR to each aggregator server (including server 30). The DR participation request includes a region of interest of DR, a type of DR (for example, DR suppression or DR increase), and a DR period. When server 30 receives a DR participation request from server 10, it calculates an adjustable DR amount (that is, an amount of electric power that can be adjusted in accordance with DR) and transmits the amount to server 10. Server 30 can calculate the adjustable DR amount, for example, based on a total of DR capacities (that is, power adjustment capability) of demand sides under the control thereof.

Server 10 determines a DR amount (that is, an amount of power adjustment asked to an aggregator) for each aggregator based on the adjustable DR amount received from each aggregator server and transmits a signal (which is also referred to as a "DR execution instruction" below) instructing each aggregator server (including server 30) to execute DR. The DR execution instruction includes a region of interest of DR, a type of DR (for example, DR suppression or DR increase), a DR amount for the aggregator, and a DR period. When server 30 receives the DR execution instruction, it allocates the DR amount to each vehicle 50 that can address DR among vehicles 50 under the control thereof, generates a DR signal for each vehicle 50, and transmits the DR signal to each vehicle 50. The DR signal may be a price signal that urges a user of vehicle 50 to regulate supply and demand or a charging command or a power feed command for server 30 to directly control vehicle 50. The price signal may include a type of DR (for example, DR suppression or DR increase), a DR amount for vehicle 50, a DR period, and incentive information. When vehicle 50 permits remote control (for example, dispatching by server 30), server 30 can directly control vehicle 50 by transmitting a charging command or a power feed command to vehicle 50.

ECU 150 receives a DR signal through communication equipment 180 from the outside of the vehicle. When ECU 150 receives the DR signal, a user of vehicle 50 can contribute to regulation of supply and demand of power grid PG by carrying out charging or discharging in accordance with the DR signal by using EVSE 40 and vehicle 50. When the user of vehicle 50 has contributed to regulation of supply and demand of power grid PG, an incentive in accordance with contribution may be paid to the user of vehicle 50 by an electric utility (for example, an electric power utility company or an aggregator) based on an agreement between the user of vehicle 50 and the electric utility.

An electric utility measures contribution with any method. The electric utility may find a contribution based on a measurement value from smart meter 11. VGI system 1 may include, in addition to smart meter 11, a wattmeter (for example, another smart meter) that measures a contribution. The electric utility may find a contribution based on a measurement value from a wattmeter (not shown) contained in EVSE 40. The electric utility may find a contribution based on a measurement value from a sensor (for example, monitoring module 121 or 131) mounted on vehicle 50. A portable charging cable may be provided with a metering function and the electric utility may find a contribution based on an amount of electric power measured by the charging cable. A user ID may be provided for each charging cable and the user ID may automatically be transmitted from the charging cable to a server (for example, server 10 or 30) of the electric utility when the user uses the charging cable. By doing so, the electric utility can identify which user has carried out charging and discharging.

Vehicle 50 shown in FIG. 2 is electrically connected to outdoor EVSE 40 through charging cable 42 while it is parked in a parking space of a residence (for example, a user's house). EVSE 40 is a non-public charging facility used only by a user and a family member of the user. In this embodiment, EVSE 40 is a charging facility adapted to backfeeding (that is, a charging and discharging facility). As connector 43 of charging cable 42 connected to EVSE 40 is connected to inlet 110 of vehicle 50, vehicle 50 and EVSE 40 can communicate with each other and electric power can be supplied and received between EVSE 40 and vehicle 50. Power supply circuit 41 included in EVSE 40 is electrically connected to power grid PG. For example, as electric power is supplied from power grid PG through power supply circuit 41 and charging cable 42 to vehicle 50, battery 130 is externally charged. As vehicle 50 carries out external power feed to EVSE 40, electric power can be backfed from vehicle 50 through charging cable 42 and power supply circuit 41 to power grid PG. Power supply circuit 41 converts electric power supplied from power grid PG into electric power suitable for external charging and converts electric power supplied from vehicle 50 into electric power suitable for backfeeding.

Power supply circuit 41 is connected to power grid PG provided by the electric power utility company with smart meter 11 being interposed. Smart meter 11 measures an amount of electric power supplied from EVSE 40 to vehicle 50. Smart meter 11 may also measure an amount of electric power backfed from vehicle 50 to EVSE 40. Smart meter 11 measures an amount of power usage each time a prescribed time period elapses (for example, each time thirty minutes elapse), stores the measured amount of power usage, and transmits the measured amount of power usage to server 10 and HEMS-GW 60. For example, IEC (DLMS/COSEM) can be adopted as a protocol for communication between smart meter 11 and server 10. Server 10 transmits at any time, a value of measurement by smart meter 11 to server 30. Server 10 may transmit the measurement value regularly or upon request from server 30.

HEMS-GW 60 transmits information on energy management (for example, information representing a state of use of electric power) to each of server 30, data center 70, and portable terminal 80. HEMS-GW 60 receives a value of measurement of the amount of electric power from smart meter 11. Smart meter 11 and HEMS-GW 60 may communicate with each other in any type of communication, and the type of communication may be a 920-MHz-band low-power wireless communication or power line communication (PLC). HEMS-GW 60 and EVSE 40 can communicate with each other, for example, through a local area network (LAN). The LAN may be wired or wireless LAN. Standards of communication between HEMS-GW 60 and EVSE 40 may be any of ECHONET Lite, smart energy profile (SEP) 2.0, and KNX.

Communication equipment 180 mounted on vehicle 50 communicates with EVSE 40 through charging cable 42. Communication between EVSE 40 and vehicle 50 may be of any type, and for example, controller area network (CAN) or PLC may be adopted. Standards of communication between EVSE 40 and vehicle 50 may be ISO/IEC15118 or IEC61851.

Communication equipment 180 wirelessly communicates with server 30, for example, through a mobile communication network (telematics). A signal exchanged between vehicle 50 and server 30 may be encrypted by a scheme designated by an aggregator. In this embodiment, communication equipment 180 and portable terminal 80 wirelessly communicate with each other. ECU 150 (FIG. 1) can control portable terminal 80 through wireless communication to give a notification to a user. Communication equipment 180 and portable terminal 80 may communicate with each other through short-range communication such as Bluetooth® (for example, direct communication in a vehicle or within an area around the vehicle).

Figure 3:
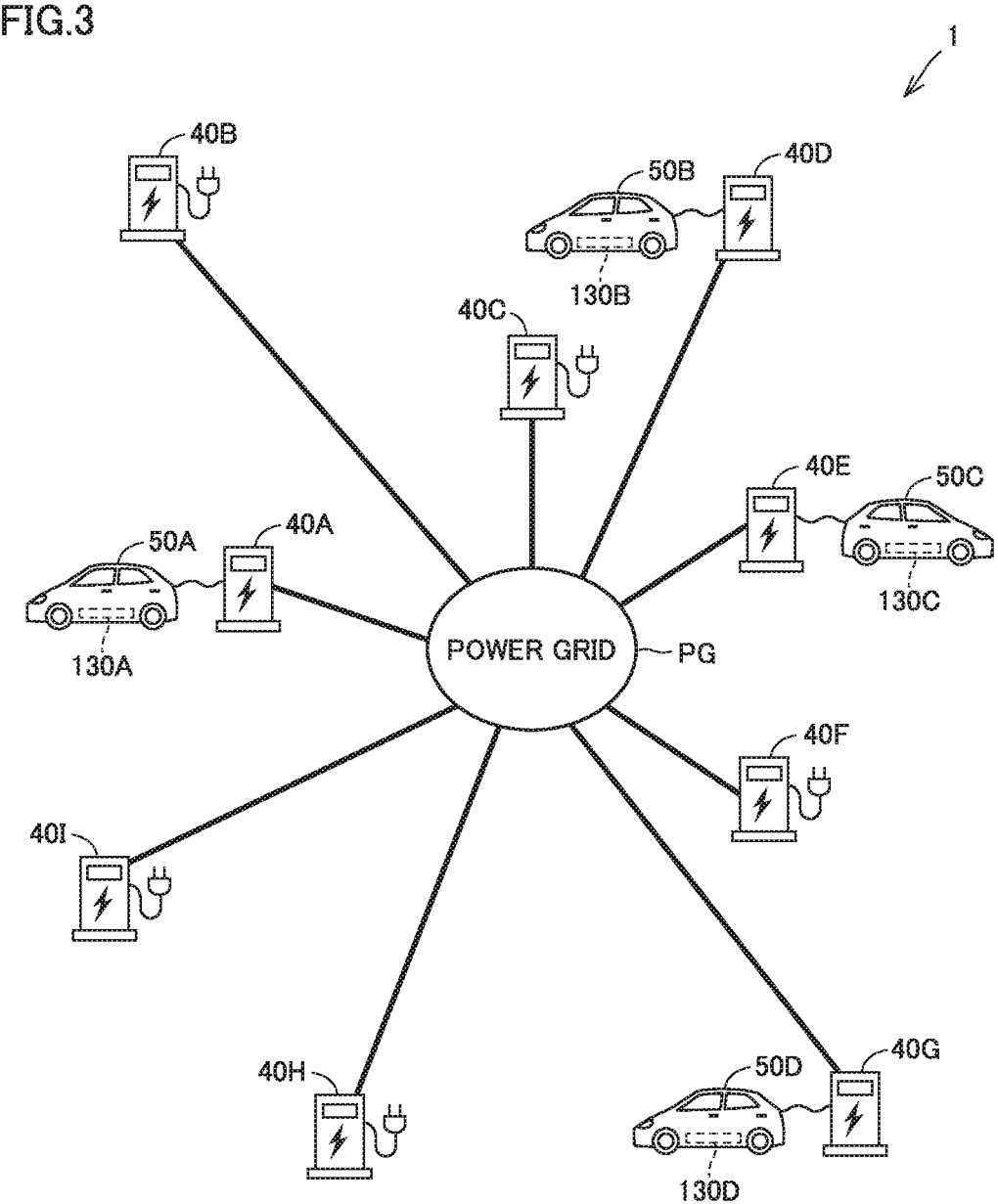
FIG. 3 is a diagram showing a power grid, a plurality of power feed facilities, and a plurality of vehicles included in the power feed system according to the embodiment of the present disclosure.

FIG. 3 is a diagram showing a power grid, a plurality of pieces of EVSE, and a plurality of vehicles included in the power feed system according to this embodiment. Referring to FIG. 3, VGI system 1 includes EVSE 40A to 40I, vehicles 50A to 50D, and power grid PG that supplies electric power to each of pieces of EVSE 40A to 40I. Vehicles 50A to 50D include externally power feedable batteries 130A to 130D, respectively. Power grid PG is a power network provided outside vehicles 50A to 50D). Each of vehicles 50A to 50D can electrically be connected to power grid PG through any of pieces of EVSE 40A to 40I. In the example shown in FIG. 3, vehicles 50A, 50B, 50C, and 50D are electrically connected to power grid PG through EVSE 40A, 40D, 40E, and 40G, respectively. Power grid PG can supply electric power to vehicles 50A to 50D through EVSE 40A, 40D, 40E, and 40G, respectively.

Referring to FIGS. 2 and 3, in VGI system 1, vehicles 50A to 50C carry out relayed power feed. Vehicles 50A to 50C carry out external power feed successively in the relayed manner. Electric power output from each of vehicles 50A to 50C through relayed external power feed is supplied to power grid PG. Server 30 can measure a total amount of electric power supplied from vehicles 50A to 50C to power grid PG, feed power from each of vehicles 50A to 50C, and total electric power which will be described later, by the method of measuring a contribution described previously. It is vehicle 50A that carries out external power feed in the first place (which is also referred to as an "earliest vehicle" below) among vehicles 50A to 50C, and vehicles carry out external charging in the order of vehicle 50A, vehicle 50B, and vehicle 50C. A group constituted of a plurality of vehicles that carry out relayed power feed in cooperation is also referred to as a "power feed group."

Figure 4:
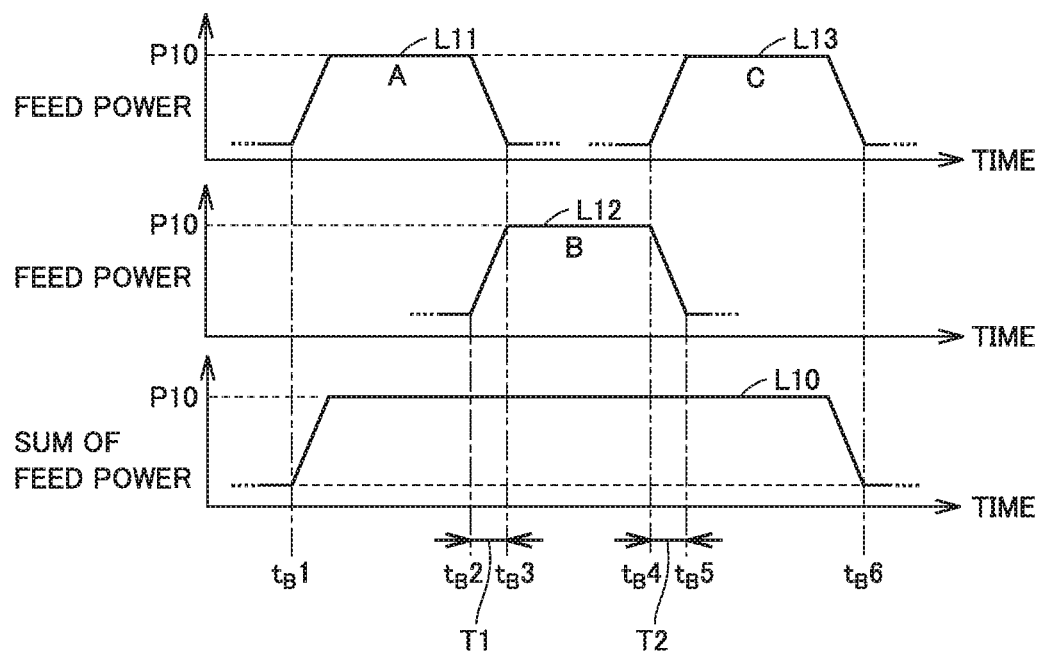
FIG. 4 is a diagram for illustrating relayed power feed carried out by the plurality of vehicles included in the power feed system shown in FIGS. 2 and 3.

FIG. 4 is a diagram for illustrating relayed power feed carried out by vehicles 50A to 50C. In FIG. 4, lines L11 to L13 represent transition of feed power of vehicles 50A to 50C, respectively. A line L10 shows the sum of feed power of all vehicles (that is, vehicles 50A to 50C) constituting one power feed group.

Referring to FIG. 4 together with FIGS. 1 to 3, server 30 requests vehicle 50A to carry out backfeeding to power grid PG by transmitting a DR suppression signal to vehicle 50A. When vehicle 50A receives a first start signal from server 30 while it is electrically connected to power grid PG after vehicle 50A receives the DR suppression signal from server 30, vehicle 50A starts external power feed in response to the request in the DR suppression signal. In the example in FIG. 4, external power feed by vehicle 50A is started at timing $t_B1$.

Before vehicle 50A quits started external power feed, vehicle 50A transmits a first end prediction signal that predicts end of started external power feed to server 30. In the example in FIG. 4, the first end prediction signal is transmitted at timing slightly before timing $t_B2$. When server 30 receives the first end prediction signal from vehicle 50A, it transmits a second start signal to vehicle 50B.

When vehicle 50B receives the second start signal while it is electrically connected to power grid PG, it starts external power feed before external power feed started in vehicle 50A ends. In the example in FIG. 4, external power feed by vehicle 50B is started at timing $t_B2$. Thereafter at timing $t_B3$, external power feed by vehicle 50A ends. During a period T1 in FIG. 4, both of external power feed by vehicle 50A and external power feed by vehicle 50B are simultaneously carried out.

Before vehicle 50B quits external power feed started by reception of the second start signal, vehicle 50B transmits a second end prediction signal that predicts end of started external power feed to server 30. In the example in FIG. 4, the second end prediction signal is transmitted at timing slightly before timing $t_B4$. When server 30 receives the second end prediction signal from vehicle 50B, it transmits a third start signal to vehicle 50C.

When vehicle 50C receives the third start signal while it is electrically connected to power grid PG, it starts external power feed before end of external power feed started in vehicle 50B. In the example in FIG. 4, external power feed by vehicle 50C is started at timing $t_B4$. Thereafter at timing $t_B5$, external power feed by vehicle 50B ends. Further thereafter, at timing $t_B6$, external power feed by vehicle 50C ends. During a period T2 in FIG. 4, both of external power feed by vehicle 50B and external power feed by vehicle 50C are simultaneously carried out.

Vehicles 50A to 50C carry out relayed power feed as above. In passing on relayed external power feed from the first vehicle to the second vehicle, a part just before end of a period of power feed in the first vehicle overlaps with a part immediately after start of a period of power feed in the second vehicle. Therefore, there is no power feed discontinuity at the time of succession between the vehicles and external power feed is continuously carried out. Controller 31 of server 30 transmits a feed power command to at least one of the first vehicle and the second vehicle during the overlapping period (that is, a period during which both of the first vehicle and the second vehicle simultaneously carry out external power feed). In response to the feed power command, at least one of the first vehicle and the second vehicle is controlled such that total electric power (that is the sum of electric power fed from the first vehicle and electric power fed from the second vehicle) attains to target electric power (for example, electric power P10). Controller 31 according to this embodiment corresponds to an exemplary "power feed controller" according to the present disclosure. Though target electric power is defined as electric power P10 in this embodiment, any target electric power can be set. Target electric power may be fixed or variable. Target electric power may be set to feed power requested in a DR execution instruction. Feed power corresponds to an exemplary DR amount.

In the example shown in FIG. 4, in passing on external power feed in the relayed manner from vehicle 50A to vehicle 50B, after period T1 during which both of vehicles 50A and 50B simultaneously carry out external power feed, external power feed only by vehicle 50B of vehicles 50A and 50B is started. At this time, vehicle 50A operates as the "first vehicle" according to the present disclosure and vehicle 50B operates as the "second vehicle" according to the present disclosure. Period T1 corresponds to an exemplary "overlapping period" according to the present disclosure. In passing on external power feed in the relayed manner from vehicle 50B to vehicle 50C, after period T2 during which both of vehicles 50B and 50C simultaneously carry out external power feed, external power feed only by vehicle 50C of vehicles 50B and 50C is started. At this time, vehicle 50B operates as the "first vehicle" according to the present disclosure and vehicle 50C operates as the "second vehicle" according to the present disclosure. Period T2 corresponds to an exemplary "overlapping period" according to the present disclosure.

In this embodiment, each of vehicles 50A to 50C carries out external power feed in a prescribed power feed pattern. The power feed pattern of each of vehicles 50A to 50C will be described below with reference to FIG. 5.

Figure 5:
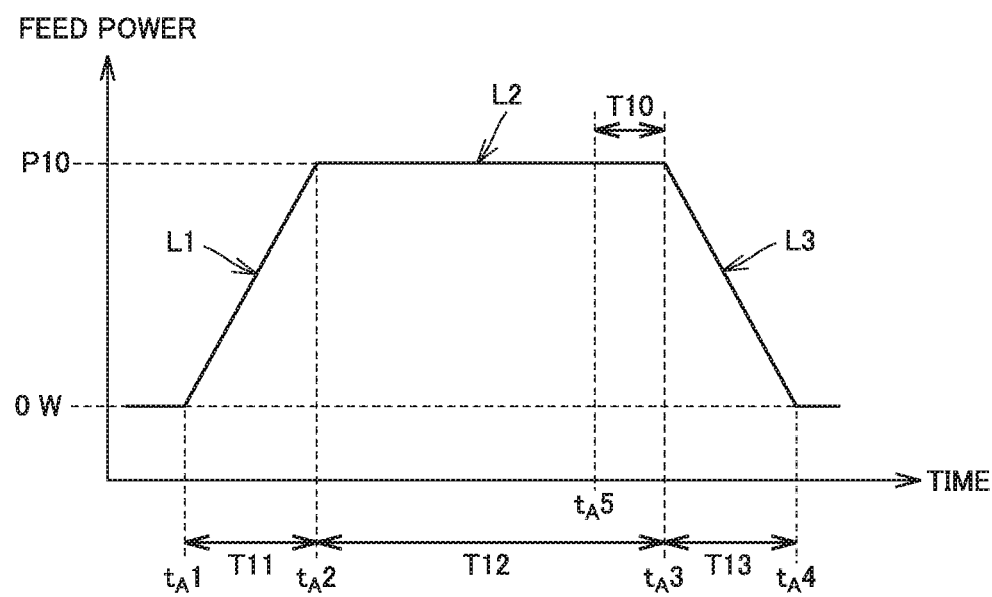
FIG. 5 is a diagram showing a power feed pattern adopted in the power feed system shown in FIGS. 2 and 3.

FIG. 5 is a diagram showing a power feed pattern adopted in the power feed system according to this embodiment. Referring to FIG. 5, this power feed pattern includes a power feed period T11 (from timing $t_A1$ to timing $t_A2$) immediately after start of power feed, a power feed period T12 (from timing $t_A2$ to timing $t_3$) following power feed period T11, and a power feed period T13 (from timing $t_A3$ to timing $t_A4$) following power feed period T12. Timing $t_A1$ corresponds to power feed start timing and timing $t_A4$ corresponds to power feed end timing.

Power feed period T12 is a period during which external power feed with constant electric power P10 is carried out. Each of power feed periods T11 and T13 is a period during which external power feed with electric power lower than electric power P10 is carried out. Power feed period T11 is a period during which feed power is increased from 0 W to electric power P10. Power feed period T13 is a period during which feed power is lowered from electric power P10 to 0 W. Electric power L1 during power feed period T11 is also referred to as "rising electric power." A rate of increase in electric power fed from vehicle 50 during power feed period T11 is also referred to as a "rate of rise." Rising electric power becomes higher with lapse of time.

Timing tall corresponds to timing of rise of feed power. Electric power L2 during power feed period T12 is also referred to as "stable electric power." Stable electric power is kept substantially constant. Timing $t_A2$ corresponds to timing of stabilization of feed power. Electric power L3 during power feed period T13 is also referred to as "falling electric power." A rate of lowering in electric power fed from vehicle 50 during power feed period T13 is also referred to as a "rate of fall." Falling electric power becomes lower with lapse of time. Timing $t_A3$ corresponds to timing of fall of feed power.

In this embodiment, a trapezoidal power feed pattern shown in FIG. 5 is adopted. In this embodiment, each of the rate of rise and the rate of fall is equal to or lower than 3 kW/second on average. Each of the rate of rise and the rate of fall may be not lower than 0.1 kW/second and not higher than 3 kW/second on average or not lower than 0.1 kW/second and not higher than 1 kW/second on average. The rate of fall and the rate of rise according to this embodiment correspond to an exemplary "first rate" and an exemplary "second rate" according to the present disclosure, respectively.

When ECU 150 (FIG. 1) of each vehicle 50 receives a power feed start instruction (for example, any of the first to third start signals) from server 30, it increases feed power from 0 W to prescribed electric power (for example, electric power P10 shown in FIG. 5), keeps feed power at prescribed electric power for a prescribed period (for example, power feed period T12 shown in FIG. 5), and when the prescribed period elapses, it lowers feed power to 0 W. A time period spent for increasing feed power from 0 W to prescribed electric power by each vehicle 50 may be not shorter than one second and not longer than thirty seconds or may be not shorter than ten seconds and not longer than twenty seconds. A time period spent for lowering feed power from prescribed electric power to 0 W by each vehicle 50 may be not shorter than one second and not longer than thirty seconds or may be not shorter than ten seconds and not longer than twenty seconds. ECU 150 may perform gradual change processing on rising electric power such that the rate of rise does not exceed a prescribed value (for example, 3 kW/second). ECU 150 may perform gradual change processing on falling electric power such that the rate of fall does not exceed a prescribed value (for example, 3 kW/second).

In this embodiment, in the power feed pattern shown in FIG. 5, feed power is changed at the same rate in directions different from each other (increase/decrease) during power feed periods T11 and T13. In the power feed pattern shown in FIG. 5, feed power is changed at a constant rate during each of power feed periods T11 and T13. Without being limited as such, magnitude of each of the rate of rise and the rate of fall (absolute value) may be different from each other. Furthermore, the rate of change in feed power during each of power feed periods T11 and T13 does not have to be constant. The rate of change in feed power during power feed periods T11 and T13 may gradually be increased or lowered. Feed power may be changed stepwise during power feed periods T11 and T13.

Referring to FIG. 5 together with FIGS. 1 to 3, the power feed pattern is stored in storage 153 (FIG. 1) in each of vehicles 50A to 50C. Each of timing $t_A1$ to timing $t_A4$ is not fixed but is variable depending on a situation. In this embodiment, when vehicle 50 receives a start signal (for example, any of the first to third start signals) from server 30 (FIG. 2), ECU 150 (FIG. 1) determines timing of reception of the start signal as timing $t_A1$. An inclination of each of rising electric power and falling electric power may be fixed. ECU 150 may change at least one of the inclination of rising electric power (and timing $t_A2$) and the inclination of falling electric power (and timing $t_A4$) depending on a situation. In this embodiment, ECU 150 determines timing $t_A3$ based on the SOC of battery 130. For example, ECU 150 finds timing at which the SOC of battery 130 becomes equal to or lower than a prescribed SOC value based on the SOC of battery 130 at timing $t_A1$, the inclination of rising electric power, and electric power P10 (for example, feed power requested in the DR signal), and determines the obtained timing as timing $t_A3$. ECU 150 may sequentially estimate timing at which the SOC of battery 130 becomes equal to or lower than the prescribed SOC value during power feed period T12 and may update timing $t_A3$ with the estimated timing. ECU 150 transmits an end prediction signal (for example, the first end prediction signal or the second end prediction signal) to server 30 at timing slightly before timing $t_A3$ (more specifically, timing $t_A5$ a prescribed time period T10 before timing $t_A3$). Timing $t_A5$ comes between timing $t_A2$ and timing $t_A3$. Prescribed time period T10 may be fixed or variable. When timing $t_A3$ comes, ECU 150 lowers feed power at a prescribed rate. When ECU 150 receives a feed power command from server 30 during the overlapping period (for example, period T1 or period T2), ECU 150 controls feed power in accordance with the feed power command. Namely, ECU 150 prioritizes the feed power command from server 30 over the power feed pattern stored in storage 153.

Figure 6:
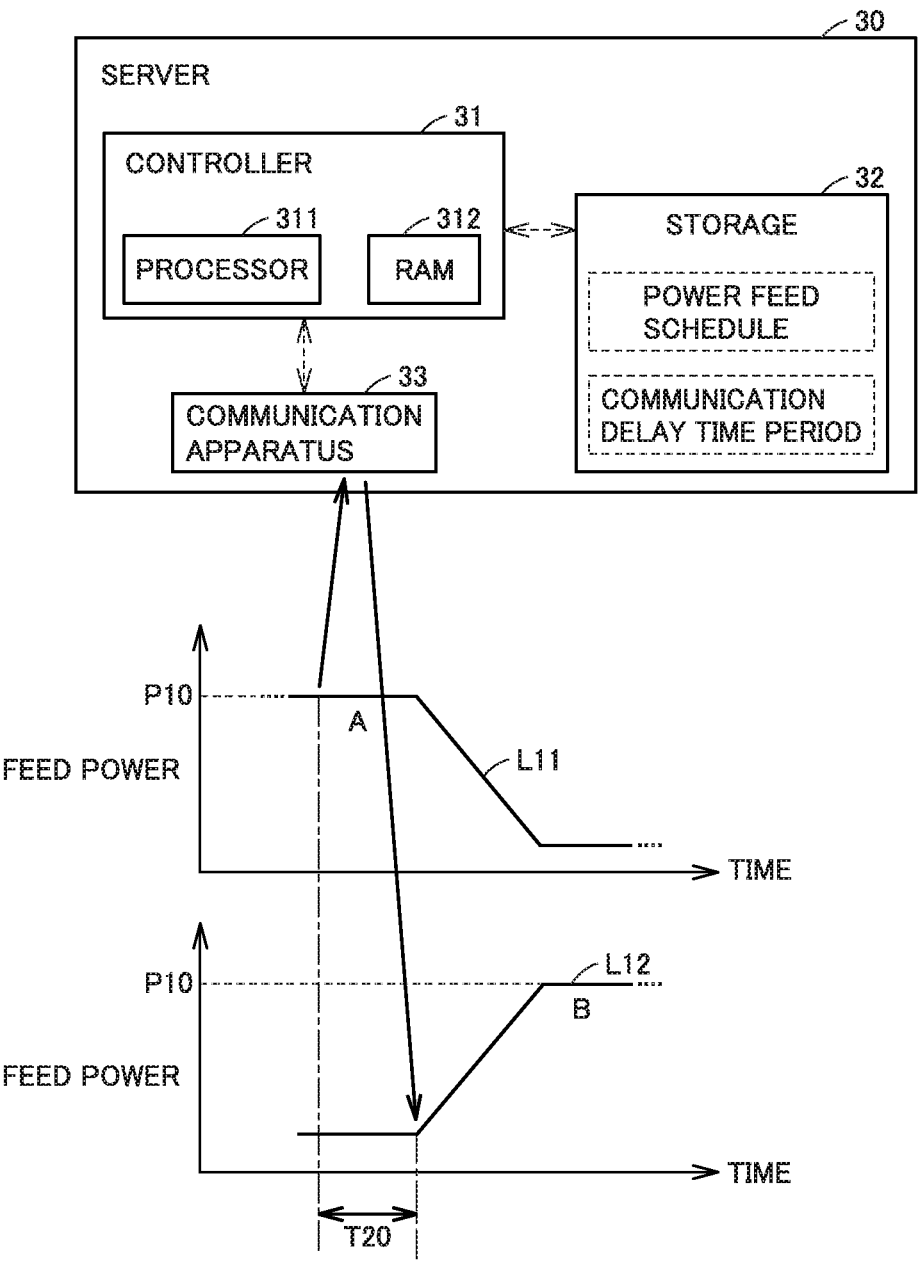
FIG. 6 is a diagram showing a configuration of a server included in the power feed system shown in FIGS. 2 and 3.

In the power feed system (VGI system 1) according to this embodiment, each of vehicles 50A to 50C carries out external power feed in response to a signal received from server 30. FIG. 6 is a diagram showing a configuration of server 30. Referring to FIG. 6, controller 31 of server 30 includes a processor 311 and a RAM 312, performs prescribed information processing, and controls communication apparatus 33. Communication apparatus 33 includes various communication I/Fs. Controller 31 communicates with the outside through communication apparatus 33.

Storage 32 of server 30 can store information that is put thereinto. Storage 32 may include at least one of a hard disk drive and a solid state drive (SSD). Storage 32 stores information on each vehicle 50 included in VGI system 1. Identification information (which is also referred to as a "vehicle ID" below) for identification of each vehicle 50 included in VGI system 1 is provided for each vehicle 50. Server 30 manages information for each vehicle 50 as being distinguished based on the vehicle ID. The vehicle ID may be vehicle identification number (VIN).

Storage 32 stores a power feed schedule (more specifically, a provisional power feed schedule which will be described below) for each vehicle 50.

When controller 31 receives a DR execution instruction from server 10, it selects vehicles 50 in number necessary for meeting the request from server 10. Selected vehicle 50 is also referred to as a "DR vehicle" below. When the DR execution instruction requests for backfeeding, controller 31 creates a provisional power feed schedule (that is, information indicating time of start and end of power feed) for each DR vehicle. The created provisional power feed schedule corresponds to a DR period (that is, information indicating time of start and end of DR) for each DR vehicle. The provisional power feed schedule designates a day and an approximate time of day during which power feed is requested to be carried out. Controller 31 transmits a DR signal (more specifically, a DR suppression signal) including the created provisional power feed schedule to a user of each DR vehicle and requests the user to give an answer (answerback) as to whether or not the user approves the DR signal. The DR signal may be transmitted to communication equipment 180 mounted on the DR vehicle or to portable terminal 80 carried by the user of the DR vehicle. The time of start of power feed indicated by the provisional power feed schedule may come several hours after timing of transmission of the DR signal or on the next day or later.

When controller 31 obtains an answer "not approve" from any user, controller 31 excludes vehicle 50 belonging to the user who has not given approval from candidates for the DR vehicle and selects again DR vehicles. When an answer "approve" has been obtained from all users, controller 31 fixes each vehicle 50 belonging to the user who has given approval as the DR vehicle. Controller 31 notifies the user of each DR vehicle that electric power deal has been done and controls storage 32 to store the vehicle ID of each DR vehicle in association with the DR execution instruction. Furthermore, controller 31 controls storage 32 to store the provisional power feed schedule for each DR vehicle in association with the vehicle ID of the DR vehicle.

In this embodiment, in passing on external power feed in the relayed manner from vehicle 50A to vehicle 50B, vehicle 50A transmits the first end prediction signal, and thereafter timing of fall of feed power of vehicle 50A (which is also referred to as "first fall timing" below) comes. The first fall timing corresponds to timing $t_A3$ in FIG. 5. Then, server 30 transmits the second start signal to vehicle 50B, and thereafter timing of rise (which is also referred to as "second rise timing" below) of feed power of vehicle 50B comes. Second rise timing corresponds to timing $t_A1$ in FIG. 5. Server 30 can control the second rise timing by adjusting timing of transmission of the second start signal.

Figure 7:
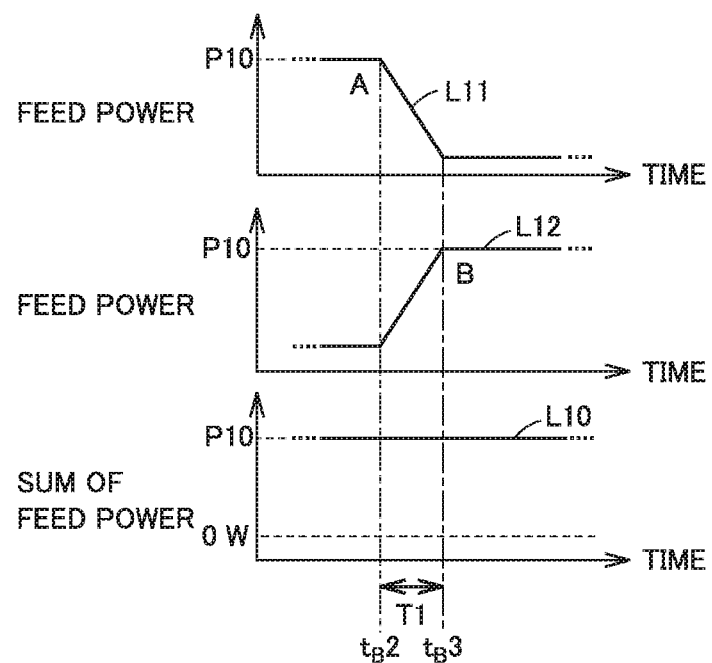
FIG. 7 is a diagram for illustrating transition of feed power when timing of fall of feed power of the first vehicle matches with timing of rise of feed power of the second vehicle in the power feed system shown in FIGS. 2 and 3.
Figure 8:
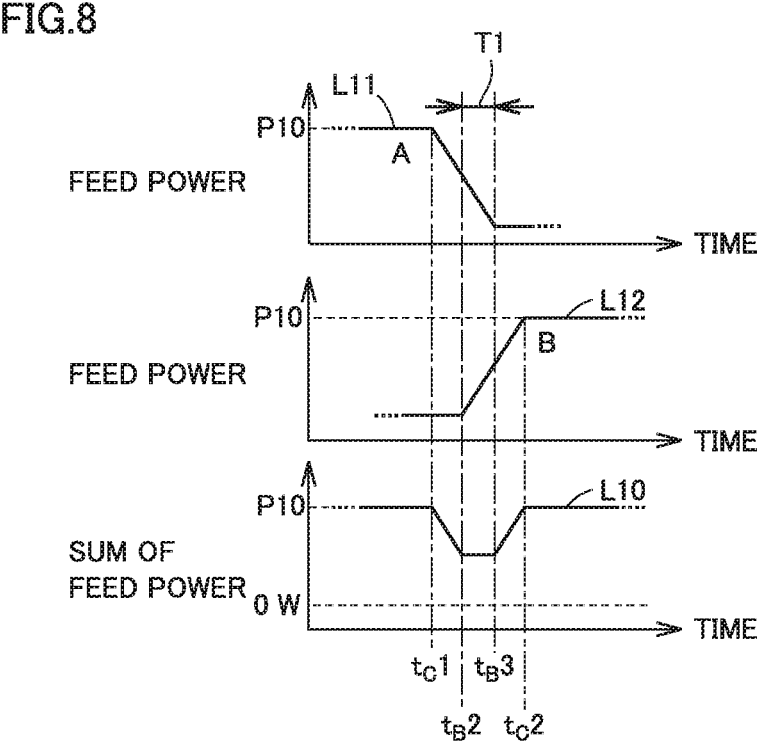
FIG. 8 is a diagram for illustrating transition of feed power when timing of rise of feed power of the second vehicle is later than timing of fall of feed power of the first vehicle in the power feed system shown in FIGS. 2 and 3.
Figure 9:
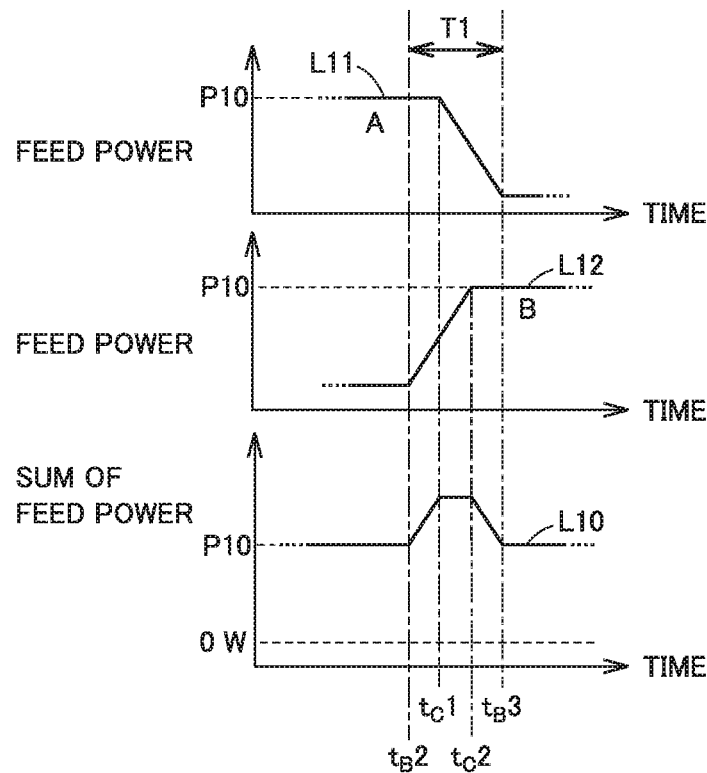
FIG. 9 is a diagram for illustrating transition of feed power when timing of rise of feed power of the second vehicle is earlier than timing of fall of feed power of the first vehicle in the power feed system shown in FIGS. 2 and 3.

Transition of feed power in each case of match between the first fall timing and the second rise timing and unmatch therebetween will be described below with reference to FIGS. 7 to 9. Each of FIGS. 7 to 9 shows transition of feed power when vehicles 50A and 50B carry out external power feed in the trapezoidal power feed pattern shown in FIG. 5 and server 30 does not transmit a feed power command to vehicles 50A and 50B. In the example shown in FIGS. 7 to 9, server 30 does not adjust feed power during the overlapping period.

FIG. 7 is a diagram for illustrating transition of feed power when the first fall timing and the second rise timing match with each other. Referring to FIG. 7, as shown with lines L11 and L12, the first fall timing matches with timing $t_B2$ (that is, the second rise timing at which external power feed by vehicle 50B is started). Then, timing of stabilization of feed power of vehicle 50B (that is, timing $t_A2$ shown in FIG. 5) matches with timing $t_B3$ at which external power feed by vehicle 50A ends. As shown with line L10, the sum of feed power during period T1 (the overlapping period) is maintained at the level equal to the level before and after period T1.

FIG. 8 is a diagram for illustrating transition of feed power when the second rise timing is later than the first fall timing. Referring to FIG. 8, as shown with lines L11 and L12, timing $t_B2$ (second rise timing) comes later than timing $t_C1$ (first fall timing). Accordingly, stabilization timing $t_C2$ of feed power of vehicle 50B is later than timing $t_B3$ of end of external power feed by vehicle 50A. As shown with line L10, the sum of feed power during period T1 (overlapping period) is smaller than that before and after period T1.

FIG. 9 is a diagram for illustrating transition of feed power when the second rise timing is earlier than the first fall timing. Referring to FIG. 9, as shown with lines L11 and L12, timing $t_B2$ (second rise timing) comes earlier than timing $t_C1$ (first fall timing). Accordingly, stabilization timing $t_C2$ of feed power of vehicle 50B is earlier than timing $t_B3$ of end of external power feed by vehicle 50A. As shown with line L10, the sum of feed power during period T1 (overlapping period) is larger than that before and after period T1.

In this embodiment, controller 31 of server 30 controls total electric power (that is, the sum of electric power fed from vehicle 50A and electric power fed from vehicle 50B) during period T1 (overlapping period) to target electric power (for example, electric power P10). At this time, when the first fall timing substantially matches with the second rise timing, an amount of control of feed power can be smaller than when the first fall timing deviates from the second rise timing (see FIGS. 7 to 9). As the amount of control is smaller, accuracy of control tends to be higher. The first fall timing, however, may deviate from the second rise timing (more specifically, the second rise timing is later than the first fall timing) due to a communication delay time period (that is, time required for server 30 to communicate with vehicle 50).

In this embodiment, controller 31 of server 30 estimates the communication delay time period and determines timing of transmission of the second start signal based on the estimated communication delay time period. The estimated communication delay time period is stored in storage 32. Vehicle 50A transmits the first end prediction signal before the first fall timing. The communication delay time period and a method of estimating the same will be described below.

Referring again to FIG. 6, a delay time period T20 corresponds to a time period from transmission of the first end prediction signal by vehicle 50A until reception of the second start signal by vehicle 50B. Delay time period T20 includes a time period (which is also referred to as a "first communication delay time period" below) from transmission of the first end prediction signal by vehicle 50A until reception of the first end prediction signal by server 30 and a time period (which is also referred to as a "second communication delay time period" below) from transmission of the second start signal by server 30 until reception of the second start signal by vehicle 50B. The total of the first and second communication delay time periods corresponds to the communication delay time period. The communication delay time period is varied by a communication environment (for example, congestion of a communication line and occurrence of a communication failure). The communication failure may occur, for example, due to bad weather or a failure of a facility. Controller 31 estimates the communication delay time period at prescribed timing and has storage 32 store the estimated communication delay time period. Controller 31 may estimate the communication delay time period in prescribed cycles and update the communication delay time period in storage 32 in accordance with a communication environment that changes every moment.

When the first end prediction signal includes time of transmission, controller 31 can find the first communication delay time period based on the time of reception of the first end prediction signal and time of transmission included in the first end prediction signal. Controller 31 can then estimate the second communication delay time period based on the obtained first communication delay time period. Without being limited as such, any method of estimating the communication delay time period is applicable. For example, controller 31 may estimate the second communication delay time period based on a time period from transmission of the second start signal until start of external power feed by vehicle 50B. Controller 31 may specify timing of start of external power feed by vehicle 50B by monitoring feed power supplied from vehicle 50B to EVSE 40D (FIG. 3). Alternatively, controller 31 may estimate the communication delay time period based on a time period required for another communication (that is, communication with a counterpart other than vehicles 50A and 50B). Alternatively, controller 31 may estimate the communication delay time period based on information obtained from an entity that manages a communication line.

Delay time period T20 may be varied also by a processing delay time period (that is, time for processing information by server 30). Therefore, controller 31 of server 30 may determine timing of transmission of the second start signal also in consideration of the processing delay time period in addition to the communication delay time period described above. The processing delay time period may be, for example, a time period required for server 30 to generate the second start signal. ECU 150 may determine prescribed time period T10 (FIG. 5) based on at least one of the communication delay time period and the processing delay time period.

Controller 31 determines timing of transmission of the second start signal so as to bring the first fall timing and the second rise timing closer to each other based on the communication delay time period estimated as above. Even under such control, however, the first fall timing does not necessarily match with the second rise timing. For example, the first fall timing may deviate from the second rise timing due to an error in estimation of the communication delay time period. In this embodiment, by adopting the trapezoidal power feed pattern shown in FIG. 5, feed power of the first vehicle gradually falls and feed power of the second vehicle gradually rises. More specifically, each of the rate of rise and the rate of fall of the power feed pattern shown in FIG. 5 is not higher than 3 kW/second on average from start until end of period T1 (overlapping period). Therefore, fluctuation in total electric power due to relative unmatch between the first fall timing and the second rise timing is smaller than in an example where a rectangular power feed pattern is adopted. According to such a configuration, significant deviation of feed power during period T1 (overlapping period) from target electric power (for example, electric power P10) when the first fall timing deviates from the second rise timing is suppressed (see FIGS. 8 and 9).

Storage 32 stores a program and also information to be used by a program. As a program is executed by processor 311, various types of control in server 30 are carried out in this embodiment. Various types of control in server 30 are not limited to control carried out by software but can also be carried out by dedicated hardware (electronic circuitry). Any number of processors may be provided in server 30 and a processor may be prepared for each prescribed type of control.

Figure 10:
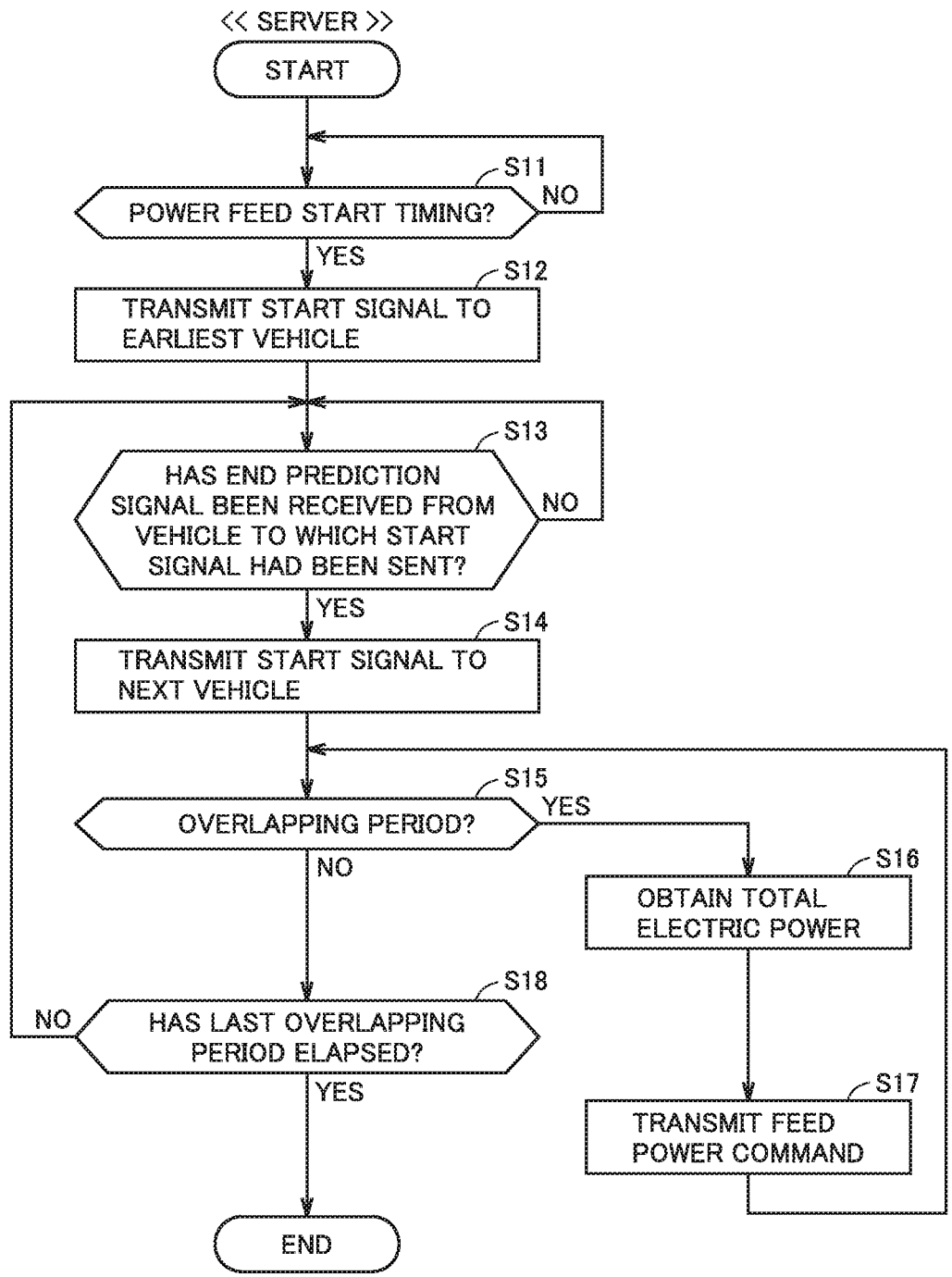
FIG. 10 is a flowchart showing processing in the server involved with relayed power feed in the power feed system shown in FIGS. 2 and 3.

FIG. 10 is a flowchart showing processing in server 30 involved with relayed power feed by vehicles 50A to 50C. Processing shown in this flowchart is performed by controller 31 of server 30.

Referring to FIG. 10 together with FIGS. 1 to 4, in a step (which is simply denoted as "S" below) 11, controller 31 determines whether or not prescribed power feed start timing has come. Controller 31 waits for the power feed start timing in S11. When the power feed start timing comes, the process proceeds to S12. Power feed start time in a provisional power feed schedule indicated by the DR suppression signal may be set as the prescribed power feed start timing.

In S12, controller 31 controls communication apparatus 33 to transmit the first start signal to the earliest vehicle (that is, vehicle 50A). External power feed by vehicle 50A is thus started (timing $t_B1$ in FIG. 4). Then, in S13, controller 31 waits for an end prediction signal from the vehicle (that is, vehicle 50A) to which the controller has transmitted the first start signal. Vehicle 50A transmits the first end prediction signal at timing prescribed time period T10 (FIG. 5) before timing $t_B2$ (FIG. 4). When server 30 receives the first end prediction signal from vehicle 50A (YES in S13), in S14, controller 31 controls communication apparatus 33 to transmit the second start signal to a next vehicle (that is, vehicle 50B). External power feed by vehicle 50B is thus started. In succession, in S15, controller 31 determines whether or not the current time is within the overlapping period (that is, whether or not both of external power feed by vehicle 50A and external power feed by vehicle 50B are simultaneously carried out). During period T1 shown in FIG. 4, determination as YES (overlapping period) is made in S15, and processing in S16 and S17 which will be described below is repeatedly performed.

In S16, controller 31 obtains total electric power (that is, the sum of feed power in external power feed simultaneously carried out during the overlapping period). During period T1 shown in FIG. 4, controller 31 obtains the sum of feed power of vehicle 50A and feed power of vehicle 50B. Controller 31 may obtain feed power based on a measurement value from each smart meter or obtain feed power measured in each vehicle or each piece of EVSE.

In S17, controller 31 controls feed power in a subsequent vehicle (that is, a vehicle that starts external power feed later) of two vehicles that carry out external power feed, so as to bring total electric power obtained in S16 closer to target electric power. During period T1 shown in FIG. 4, vehicles 50A and 50B carry out external power feed and vehicle 50A corresponds to the "earlier vehicle" and vehicle 50B corresponds to the "subsequent vehicle." In S17, controller 31 transmits to vehicle 50B, a feed power command that requests for external power feed at feed power calculated by subtracting feed power of vehicle 50A from target electric power (for example, electric power P10). Vehicle 50B is controlled in accordance with the feed power command. The sum of feed power of vehicle 50A and feed power of vehicle 50B during period T1 is thus closer to target electric power.

As period T1 shown in FIG. 4 elapses, determination as NO (not within the overlapping period) is made in S15 and the process proceeds to S18. In S18, controller 31 determines whether or not the last overlapping period (that is, period T2 shown in FIG. 4) in relayed power feed by vehicles 50A to 50C has elapsed. When the last overlapping period has not elapsed (NO in S18), the process returns to S13.

In S13, controller 31 waits for the end prediction signal from the vehicle (that is, vehicle 50B) next to vehicle 50A. When vehicle 50B transmits the second end prediction signal at timing prescribed time period T10 (FIG. 5) before timing $t_B4$ (FIG. 4), determination as YES is made in S13, and in S14, controller 31 transmits the third start signal to a vehicle (that is, vehicle 50C) next to vehicle 50B. External power feed by vehicle 50C is thus started. During period T2 shown in FIG. 4, determination as YES is made in S15 and processing in S16 and S17 is repeatedly performed. The sum of feed power of vehicle 50B and feed power of vehicle 50C during period T2 is thus brought closer to target electric power (for example, electric power P10). As period T2 elapses, determination as YES (lapse of the last overlapping period) is made in S18 and a series of processing in FIG. 10 ends.

Figure 11:
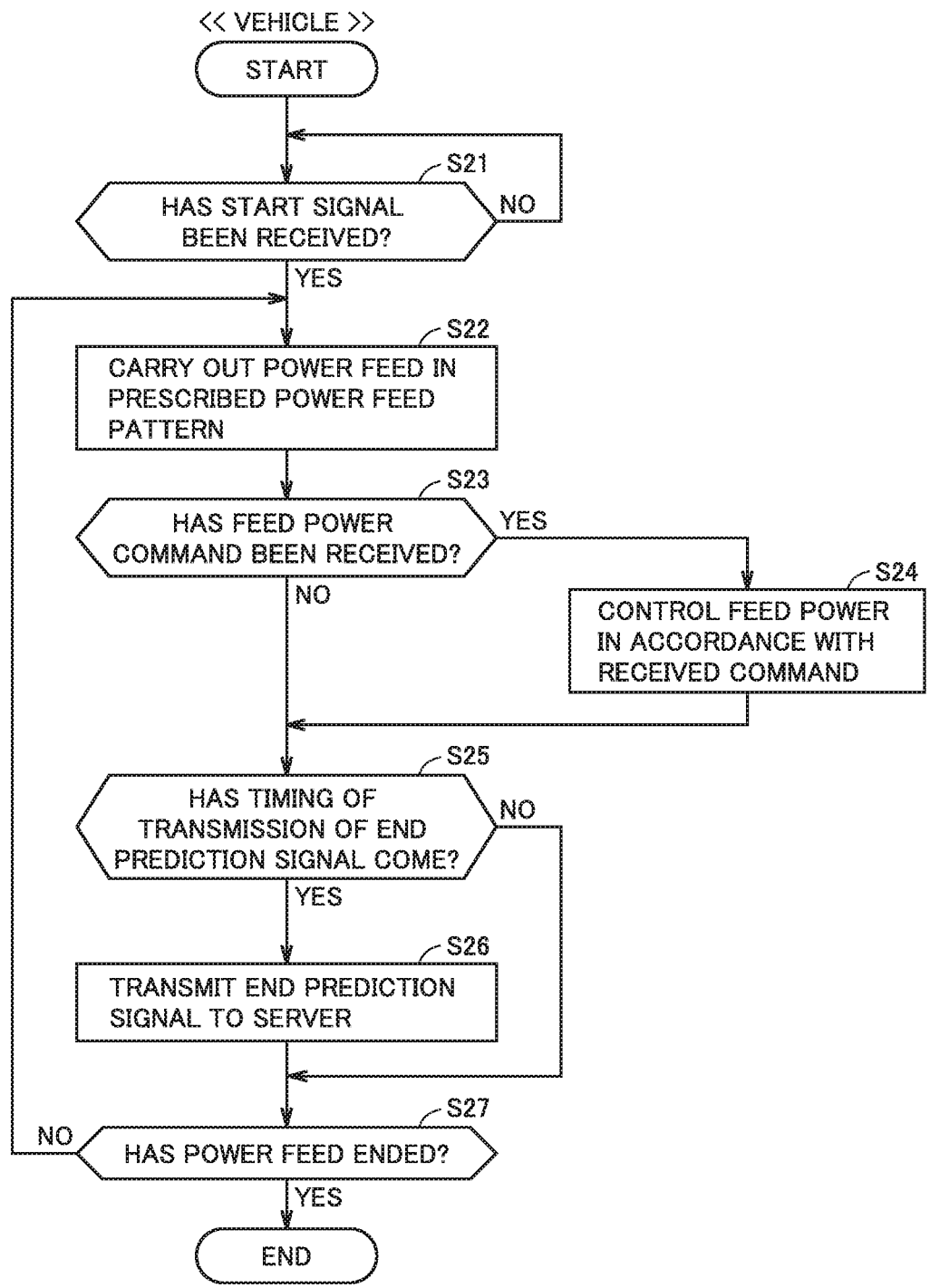
FIG. 11 is a flowchart showing processing in each vehicle involved with relayed power feed in the power feed system shown in FIGS. 2 and 3.

FIG. 11 is a flowchart showing processing involved with relayed power feed performed by ECU 150 of each vehicle 50. Processing shown in this flowchart is started, for example, when the power feed start time in the provisional power feed schedule indicated by the DR suppression signal received by each vehicle 50 comes. The provisional power feed schedule (and timing of start of processing in FIG. 11) indicated by the DR suppression signal is different for each vehicle. Server 30 may request each vehicle 50 (that is, vehicles 50A to 50C) that performs relayed power feed to adjust the clock before it transmits the first start signal (S12 in FIG. 10). Discrepancy in recognition of time among vehicles 50 is thus suppressed.

Referring to FIG. 11 together with FIGS. 1 to 4, in S21, ECU 150 waits for the start signal. In vehicle 50A, when vehicle 50A receives the first start signal from server 30 (S12 in FIG. 10), ECU 150 makes determination as YES in S21. In vehicles 50B and 50C, when respective vehicles receive the second start signal and the third start signal from server 30 (S14 in FIG. 10), ECU 150 makes determination as YES in S21.

When determination as YES (reception of the start signal) is made in S21, in S22, ECU 150 carries out external power feed in a prescribed power feed pattern (in this embodiment, the trapezoidal power feed pattern shown in FIG. 5). The power feed pattern shown in FIG. 5 is stored in advance in storage 153 (FIG. 1) of each vehicle 50. In this embodiment, ECU 150 sets the timing of reception of the start signal from server 30 as timing $t_A1$ (FIG. 5). ECU 150 estimates timing when the SOC of battery 130 is equal to or lower than a prescribed SOC value, based on feed power from the vehicle detected by monitoring module 121 shown in FIG. 1 and the SOC of battery 130 detected by monitoring module 131 shown in FIG. 1, and sets the estimated timing as timing $t_A3$ (FIG. 5). Timing $t_A3$ is updated each time processing in S22 is performed.

In S23, ECU 150 determines whether or not it has received the feed power command (S17 in FIG. 10) from server 30. Server 30 does not transmit the feed power command to the earliest vehicle. Therefore, in vehicle 50A, determination as NO is made in S23 and the process proceeds to S25.

In S25, ECU 150 determines whether or not timing to transmit the end prediction signal has come. In this embodiment, timing $t_A5$ in the power feed pattern shown in FIG. 5 is set as the timing of transmission of the end prediction signal. In S25, ECU 150 determines whether or not timing $t_A5$ calculated by subtracting prescribed time period T10 from timing $t_A3$ set in S22 has come.

When determination as YES (timing of transmission of the end prediction signal) is made in S25, in S26, ECU 150 transmits the end prediction signal to server 30 and the process proceeds to S27. The end prediction signal is a signal that predicts end of external power feed started in S22. When determination as NO (not timing of transmission of the end prediction signal) is made in S25, the process proceeds to S27 without transmission of the end prediction signal.

In S27, ECU 150 determines whether or not external power feed in the prescribed power feed pattern (S22) has ended. When external power feed has not ended (NO in S27), the process returns to S22. Thereafter, as the power feed pattern executed in S22 progresses to timing $t_A4$ (FIG. 5), determination as YES (end of external power feed) is made in S27 in FIG. 11 and a series of processing shown in FIG. 11 ends.

In vehicle 50A, as ECU 150 performs the processing in FIG. 11, external power feed is carried out in the power feed pattern shown in FIG. 5. During power feed period T12 in FIG. 5, external power feed is carried out at constant electric power P10. When timing $t_A5$ in FIG. 5 comes, determination as YES is made in S25 in FIG. 11, and in S26 in FIG. 11, vehicle 50A transmits the first end prediction signal to server 30. Thereafter, server 30 transmits the second start signal (S14 in FIG. 10) to vehicle 50B and external power feed by vehicle 50B is started.

When the power feed pattern (FIG. 5) executed by vehicle 50B progresses to timing $t_A5$ after start of external power feed by vehicle 50B, ECU 150 of vehicle 50B makes determination as YES in S25 in FIG. 11, and in S26 in FIG. 11, vehicle 50B transmits the second end prediction signal to server 30. Similarly to vehicles 50A and 50B, vehicle 50C may also transmit the end prediction signal to server 30 at timing $t_A5$ in FIG. 5. Vehicle 50C corresponds to the last vehicle (that is, the vehicle that starts external power feed last among vehicles 50A to 50C that make up the power feed group). Therefore, vehicle 50C does not have to transmit the end prediction signal.

In respective vehicles 50B and 50C, periods T1 and T2 (FIG. 4) immediately after start of external power feed fall under the overlapping period. Therefore, each of vehicles 50B and 50C receives the feed power command (S17 in FIG. 10) from server 30 during the overlapping period. During the overlapping period, determination as YES (reception of the feed power command) is made in S23 in FIG. 11 and the process proceeds to S24 in FIG. 11. In S24 in FIG. 11, ECU 150 controls feed power during the overlapping period in accordance with the feed power command received from server 30. Server 30 controls total electric power during the overlapping period to target electric power (for example, electric power P10) in accordance with the feed power command.

The overlapping period (periods T1 and T2) ends as external power feed by the earlier vehicle (that is, the vehicle that has started external power feed earlier of two vehicles that carry out external power feed during the overlapping period) ends. ECU 150 may determine feed power during a period for which it does not receive a feed power command from server 30, based on the power feed pattern stored in storage 153 (FIG. 1). For example, ECU 150 can interpolate feed power between a presently received command and a command to be received next, by calculation based on the power feed pattern.

As described above, as server 30 performs the processing shown in FIG. 10 and each of vehicles 50A to 50C performs the processing shown in FIG. 11, vehicles 50A to 50C carry out relayed power feed shown in FIG. 4. According to relayed power feed shown in FIG. 4, discontinuity in power feed does not occur in relay between the vehicles and external power feed by vehicles 50A to 50C is continuously carried out. As external power feed is carried out without discontinuity in power feed, more vehicles can participate in DR and gain incentive.

Controller 31 of server 30 controls feed power of vehicle 50B such that total electric power attains to target electric power during period T1 (overlapping period) for which both of vehicles 50A and 50B simultaneously carry out external power feed. Controller 31 of server 30 controls feed power of vehicle 50C such that total electric power attains to target electric power during period T2 (overlapping period) for which both of vehicles 50B and 50C simultaneously carry out external power feed. According to such a configuration, total electric power is controlled to target electric power during the overlapping period and hence excess or insufficiency of total electric power is suppressed. Therefore, the power feed system (VGI system 1) readily feeds desired electric power by relayed power feed. Controller 31 controls vehicles 50A to 50C such that electric power supplied to power grid PG (power network) attains to target electric power while relayed power feed is being carried out. Therefore, the power feed system (VGI system 1) readily feeds desired electric power to power grid PG (power network).

Controller 31 may control vehicle 50A or both of vehicle 50A and vehicle 50B instead of vehicle 50B when the controller brings total electric power during period T1 closer to target electric power. Alternatively, controller 31 may control vehicle 50B or both of vehicle 50B and vehicle 50C instead of vehicle 50C when the controller brings total electric power during period T2 closer to target electric power.

When controller 31 of server 30 senses difference of total electric power from target electric power during the overlapping period for which both of the first vehicle and the second vehicle simultaneously carry out external power feed, controller 31 changes feed power of at least one of the first vehicle and the second vehicle such that total electric power attains to target electric power. For example, controller 31 may perform processing in FIG. 12 instead of the processing in FIG. 10.

Figure 12:
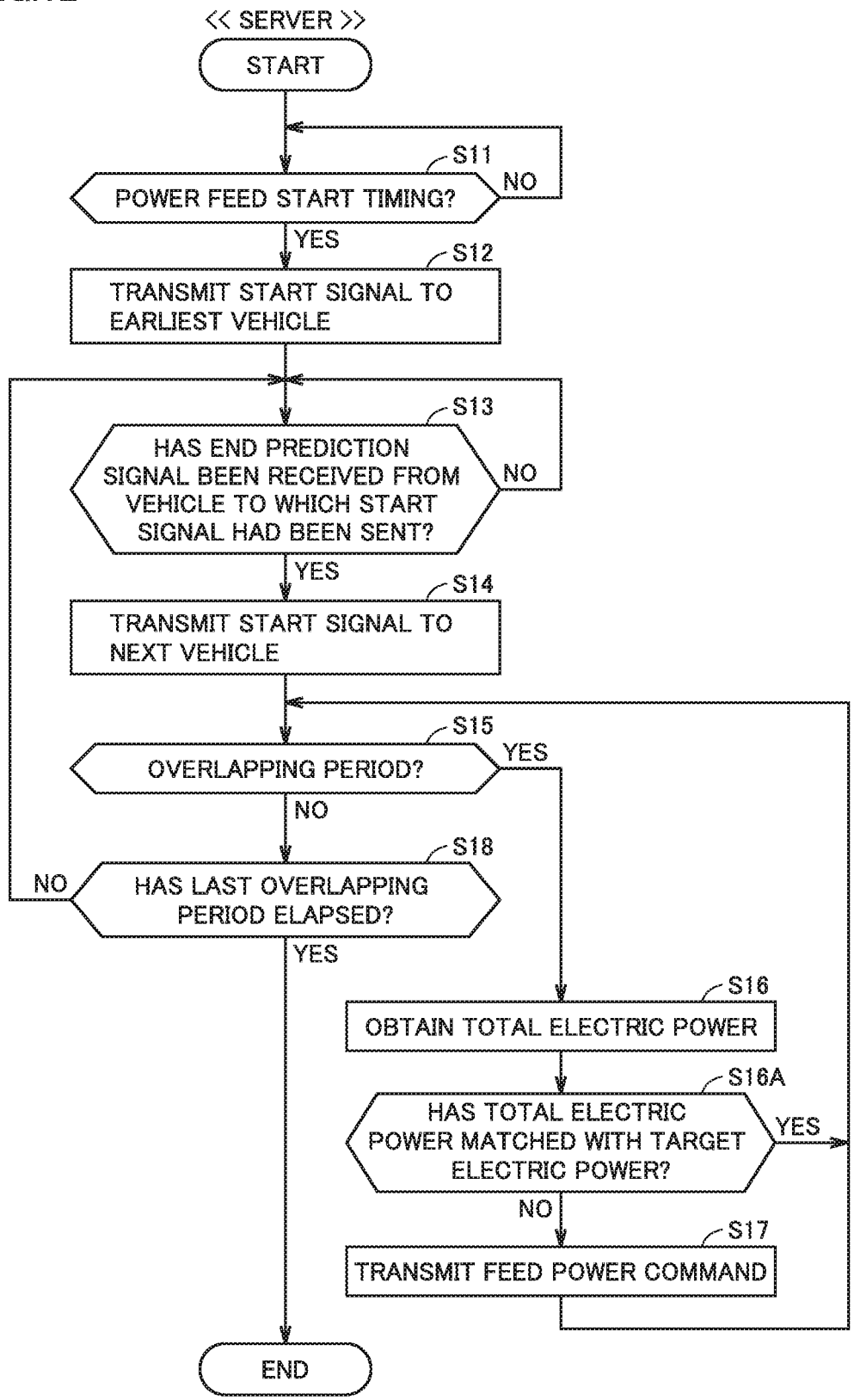
FIG. 12 is a diagram showing a modification of the processing shown in FIG. 10.

FIG. 12 is a diagram showing a modification of the processing shown in FIG. 10. Processing in FIG. 12 is different from the processing in FIG. 10 only in addition of S16A between S16 and S17. Referring to FIG. 12, in S16A, controller 31 determines whether or not total electric power matches with target electric power. When determination as YES (total electric power matching with target electric power) is made in S16A, processing returns to S15 without processing in S17 being performed. When determination as NO (total electric power not matching with target electric power) is made in S16A, the process proceeds to S17. In both cases of excess of total electric power over target electric power and shortage of total electric power as compared with target electric power, determination as NO is made in S16A. Determination as NO in S16A means that controller 31 has sensed difference of total electric power from target electric power. Controller 31 according to the modification transmits a feed power command to prescribed vehicle 50 (that is, at least one of the first vehicle and the second vehicle) when determination as NO is made in S16A. Feed power of prescribed vehicle 50 is changed in response to the feed power command such that total electric power attains to target electric power. When determination as YES is made in S16A, server 30 does not transmit the feed power command to vehicle 50 and hence load involved with communication in each of controller 31 and ECU 150 can be lessened.

Figure 13:
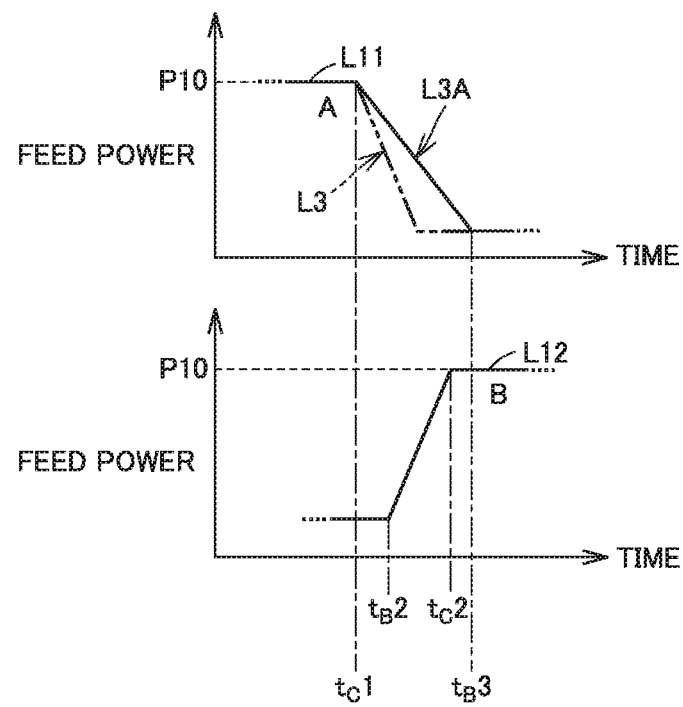
FIG. 13 is a diagram for illustrating a method of controlling a length of an overlapping period according to the modification.

In the embodiment, controller 31 of server 30 determines timing of transmission of the start signal based on the communication delay time period. Without being limited as such, controller 31 may control a length of the overlapping period based on the communication delay time period. FIG. 13 is a diagram for illustrating a method of controlling a length of the overlapping period according to the modification.

Referring to FIG. 13 together with FIG. 5, in this modification, mainly due to the communication delay time period, timing $t_B2$ of rise of feed power of vehicle 50B is later than timing (timing $t_C1$) of fall of feed power of vehicle 50A. Controller 31 determines an inclination of falling electric power of vehicle 50A based on the communication delay time period. When the communication delay time period exceeds a prescribed value, controller 31 extends the overlapping period by making the inclination of falling electric power of vehicle 50A gentler. More specifically, as shown with line L11 in FIG. 13, controller 31 corrects falling electric power (electric power L3) in the power feed pattern executed by vehicle 50A to falling electric power L3A gentler in inclination. The rate of fall of feed power of vehicle 50A is thus lowered. Timing $t_B3$ of end of external power feed by vehicle 50A is changed from timing before stabilization timing $t_C2$ of feed power of vehicle 50B to timing after that so that the overlapping period is extended. By thus changing the length of the overlapping period depending on the communication delay time period, total electric power excessively lower than target electric power is suppressed. Controller 31 of server 30 may determine the inclination of falling electric power of vehicle 50A (and the length of the overlapping period) in consideration of at least one of the processing delay time period and characteristics (power feed capability) of vehicle 50 in addition to the communication delay time period.

Figure 14:
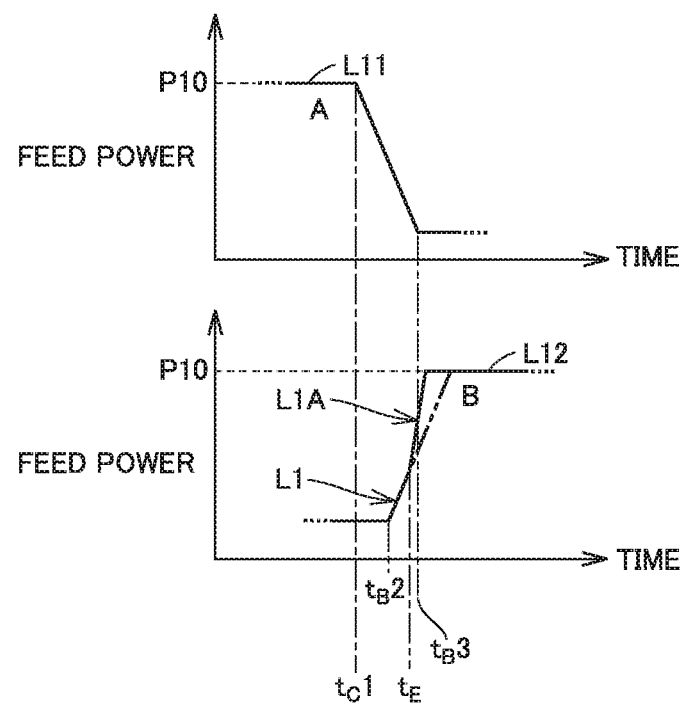
FIG. 14 is a diagram for illustrating a method of controlling an inclination of rising electric power according to the modification.

When timing of rise of feed power of the second vehicle is later than timing of fall of feed power of the first vehicle, controller 31 may steepen the inclination of rising electric power of the second vehicle. Controller 31 may variably set a degree of steepening of the inclination of rising electric power of the second vehicle, depending on the communication delay time period. FIG. 14 is a diagram for illustrating a method of controlling the inclination of rising electric power according to the modification.

Referring to FIG. 14, when controller 31 senses delay of timing $t_B2$ of rise of feed power of vehicle 50B as compared with timing (timing $t_C1$) of fall of feed power of vehicle 50A, the controller steepens the inclination of rising electric power of vehicle 50B in response to the feed power command for vehicle 50B (line L12). The rate of rise of feed power of vehicle 50B thus increases. In the example in FIG. 14, at timing $t_E$, rising electric power in the power feed pattern executed by vehicle 50B is steepened. During a period from start of external power feed by vehicle 50B at timing $t_B2$ of rise until timing $t_E$, external power feed is carried out with rising electric power L1 in the power feed pattern shown in FIG. 5. When timing $t_E$ comes, in response to the feed power command, external power feed with rising electric power L1A steeper in inclination than rising electric power L1 shown in FIG. 5 is carried out. Controller 31 may determine the inclination of rising electric power L1A based on the communication delay time period.

In passing on external power feed in the relayed manner from the first vehicle to the second vehicle, the third vehicle may stand by in a power feedable state. When relayed external power feed by the first vehicle and the second vehicle does not proceed as scheduled, controller 31 of server 30 may control the third vehicle to carry out external power feed. Vehicle 50D (FIG. 3) may be adopted as the third vehicle. While vehicles 50A to 50C are carrying out relayed power feed, vehicle 50D may stand by while it is ready to feed power to EVSE 40G. When external power feed from vehicle 50D to EVSE 40G is carried out, feed power of vehicle 50D is supplied to power grid PG (power network). Vehicle 50D makes up the power feed group together with vehicles 50A to 50C.

Figure 15:
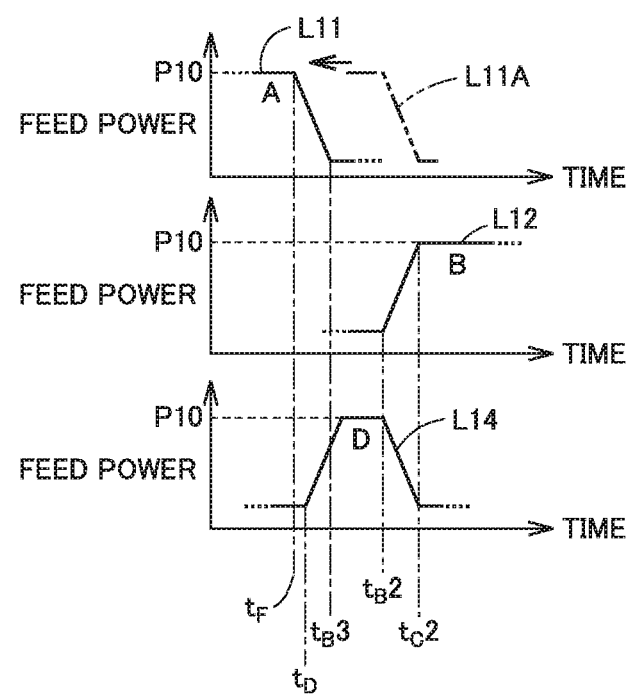
FIG. 15 is a diagram for illustrating a first modification of control of a third vehicle.

FIG. 15 is a diagram for illustrating a first modification of control of the third vehicle. In this modification, input apparatus 160 of each vehicle 50 accepts a stop operation from a user. When the user performs the stop operation onto input apparatus 160 while each vehicle 50 is carrying out external power feed, each vehicle 50 transmits a stop prediction signal to server 30 and thereafter stops external power feed that is being carried out. In FIG. 15, lines L11, L12, and L14 represent transition of feed power of respective vehicles 50A, 50B, and 50D. A line L11A represents a power feed pattern in accordance with a provisional power feed schedule included in a DR suppression signal.

Referring to FIG. 15, in this example, the user performs the stop operation onto input apparatus 160 of vehicle 50A at timing $t_F$. Vehicle 50A thus quits external power feed earlier than scheduled (line L11A). When the user performs the stop operation, ECU 150 of vehicle 50A transmits the stop prediction signal to server 30 and decreases feed power (line L11). When controller 31 of server 30 receives the stop prediction signal from vehicle 50A, it controls vehicle 50D to start external power feed at timing $t_D$ before external power feed that is being carried out by vehicle 50A is stopped. Controller 31 may control feed power (line L14) of vehicle 50D by transmitting a feed power command to vehicle 50D. In this modification, when vehicle 50A quits external power feed earlier than scheduled, controller 31 controls vehicle 50D to carry out external power feed so as to pass on relayed external power feed from vehicle 50A to vehicle 50D and then to vehicle 50B. During a period for which vehicle 50A and vehicle 50D are simultaneously carrying out external power feed, controller 31 may control at least one of vehicle 50A and vehicle 50D such that the sum of electric power fed from vehicle 50A and electric power fed from vehicle 50D attains to target electric power. During a period for which vehicle 50D and vehicle 50B are simultaneously carrying out external power feed, controller 31 may control at least one of vehicle 50D and vehicle 50B such that the sum of electric power fed from vehicle 50D and electric power fed from vehicle 50B attains to target electric power. Alternatively, controller 31 may control vehicle 50D such that the sum of electric power fed from vehicle 50A (first vehicle), electric power fed from vehicle 50B (second vehicle), and electric power fed from vehicle 50D (third vehicle) attains to target electric power. Controller 31 may match timing of fall of feed power of vehicle 50D with timing $t_B2$ of rise of feed power of vehicle 50B. Controller 31 may match timing of end of power feed from vehicle 50D with timing $t_c2$ of stabilization of feed power of vehicle 50B.

According to the configuration in the modification, when vehicle 50A quits external power feed earlier than scheduled, vehicle 50D can compensate for feed power and hence desired electric power is more readily fed to power grid PG (power network). External power feed by vehicle 50D can suppress upset of the power feed schedule as a whole in relayed power feed.

The input apparatus onto which the stop operation is performed is not limited to input apparatus 160 mounted on vehicle 50, and may be mounted on portable terminal 80 or a stationary facility (for example, EVSE 40). The power feed system according to the modification may include an input apparatus for emergency stop for a user to immediately stop external power feed that is being carried out, separately from the input apparatus onto which the stop operation is performed.

Figure 16:
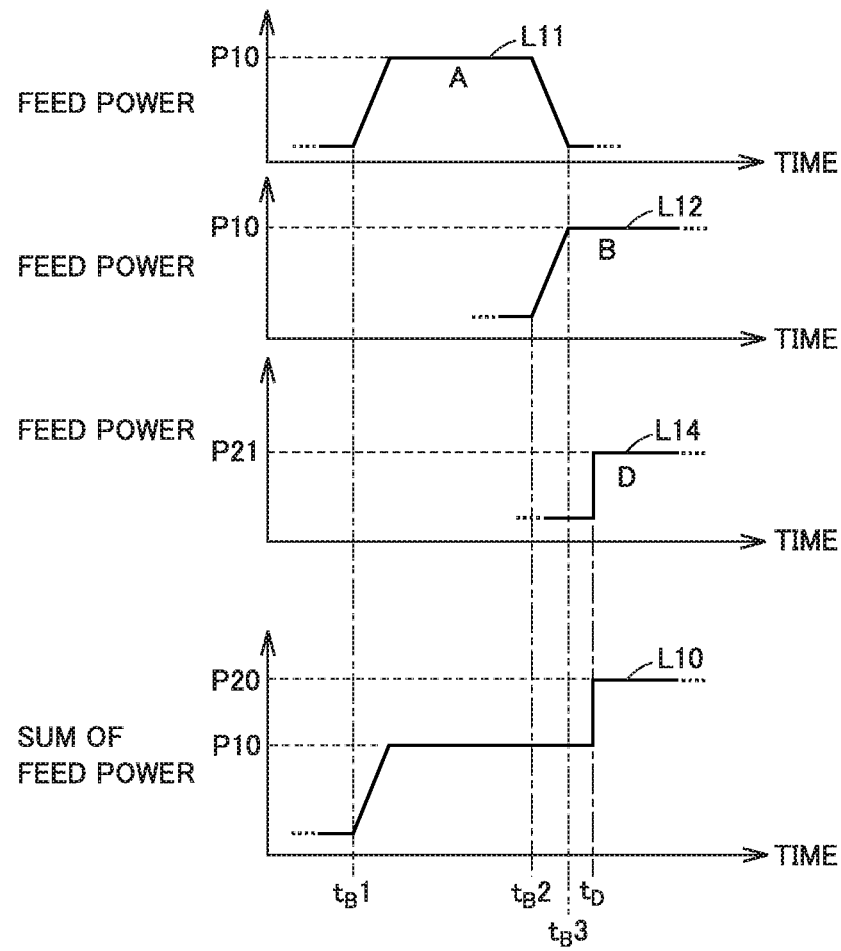
FIG. 16 is a diagram for illustrating a second modification of control of the third vehicle.

When target electric power increases during external power feed by the first vehicle or the second vehicle alone and the target electric power is not achieved by feed power of the first vehicle or the second vehicle alone, the third vehicle may carry out external power feed together with the first vehicle or the second vehicle. FIG. 16 is a diagram for illustrating a second modification of control of the third vehicle. In FIG. 16, lines L11, L12, and L14 represent transition of feed power of respective vehicles 50A, 50B, and 50D. Line L10 represents the sum of feed power of all vehicles (that is, vehicles 50A to 50D) that make up one power feed group.

Referring to FIG. 16, in this modification, target electric power increases from electric power P10 to electric power P20 while vehicle 50B alone is carrying out external power feed. Electric power P20 corresponds to electric power exceeding maximum feed power of vehicle 50B. When controller 31 of server 30 determines that feed power of vehicle 50B alone is not sufficient for achieving target electric power, it controls vehicle 50D to carry out external power feed. For example, vehicle 50D receives a power feed start instruction from controller 31 and starts external power feed at timing $t_D$. Vehicle 50D thus carries out external power feed together with vehicle 50B. Controller 31 controls vehicle 50D to compensate for a difference between feed power of vehicle 50B and target electric power. Electric power P21 in FIG. 16 corresponds to electric power calculated by subtracting electric power P10 from electric power P20. Controller 31 controls the sum of feed power of vehicle 50B and feed power of vehicle 50D to target electric power (for example, electric power P20) by transmitting the feed power command to vehicle 50B and vehicle 50D (or only to vehicle 50D) during a period after timing $t_D$ in FIG. 16.

Figure 17:
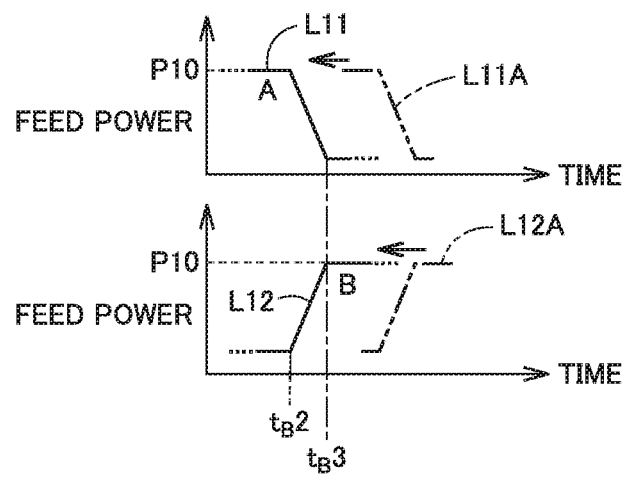
FIG. 17 is a diagram for illustrating a method of controlling the second vehicle according to the modification.

When the first vehicle quits external power feed earlier than scheduled, controller 31 of server 30 may pass on relayed external power feed from the first vehicle to the second vehicle with the overlapping period being interposed, by starting external power feed by the second vehicle earlier than scheduled. FIG. 17 is a diagram for illustrating a method of controlling the second vehicle according to the modification. Each of line L11A and a line L12A represents a power feed pattern in accordance with a provisional power feed schedule included in a DR suppression signal.

Referring to FIG. 17, in this example, vehicle 50A quits external power feed earlier than scheduled (line L11A). For example, when the SOC of battery 130A (FIG. 3) is equal to or lower than a prescribed SOC value and vehicle 50A is no longer able to continue external power feed, vehicle 50A may quit external power feed earlier than scheduled. At this time, controller 31 controls vehicle 50B to start external power feed earlier than scheduled (line L12A). External power feed in the relayed manner is thus passed on from vehicle 50A to vehicle 50B with the overlapping period being interposed. Controller 31 can sense end of external power feed by vehicle 50A earlier than scheduled, by monitoring feed power of vehicle 50A.

According to the configuration in the modification, when vehicle 50A quits external power feed earlier than scheduled, vehicle 50B can compensate for feed power and hence desired electric power is more readily fed to power grid PG (power network). Since feed power is adjusted by vehicle 50B, the third vehicle does not have to stand by.

The number of vehicles to make up one power feed group is not limited to three and any number of vehicles make up one power feed group. The number of vehicles that make up one power feed group may be set to two, ten or more, or one hundred or more.

Figure 18:
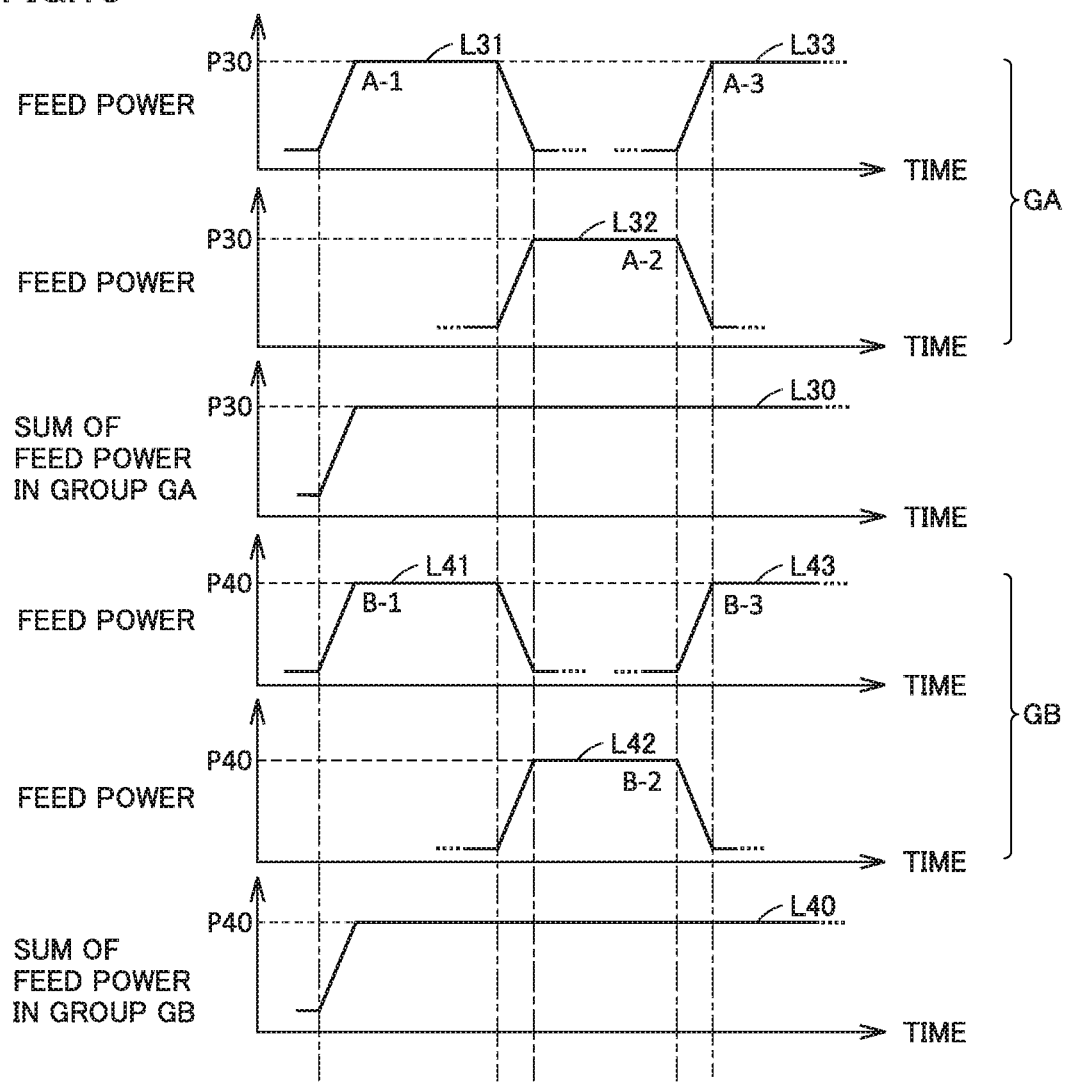
FIG. 18 is a diagram showing the modification in which a plurality of power feed groups carry out relayed power feed simultaneously in parallel.

Server 30 may control a plurality of power feed groups to carry out relayed power feed simultaneously in parallel. FIG. 18 is a diagram showing an example in which a plurality of power feed groups carry out relayed power feed simultaneously in parallel. In FIG. 18, lines L31 to L33 represent transition of feed power in respective vehicles A-1 to A-3 that make up a power feed group GA. A line L30 represents the sum of feed power of all vehicles that make up power feed group GA. In FIG. 18, lines L41 to L43 represent transition of feed power in respective vehicles B-1 to B-3 that make up a power feed group GB. A line L40 represents the sum of feed power of all vehicles that make up power feed group GB.

Referring to FIG. 18, in power feed group GA, each of vehicle A-1 and vehicles subsequent to vehicle A-1 (only vehicles A-2 and A-3 being shown in FIG. 18) carries out external power feed in a power feed pattern in which electric power P30 is set as maximum electric power. In power feed group GB, each of vehicle B-1 and vehicles subsequent to vehicle B-1 (only vehicles B-2 and B-3 being shown in FIG. 18) carries out external power feed in a power feed pattern in which electric power P40 is set as maximum electric power.

As server 30 performs the processing shown in FIG. 10 and each vehicle making up power feed groups GA and GB performs the processing shown in FIG. 11, each of power feed groups GA and GB carries out relayed power feed. Server 30 controls total electric power to target electric power by transmitting a feed power command to at least one of two vehicles that carry out external power feed during the overlapping period. The sum of feed power in power feed group GA is thus controlled to electric power P30 and the sum of feed power in power feed group GB is controlled to electric power P40. Server 30 separately controls the sum of feed power in power feed group GA and the sum of feed power in power feed group GB. Without being limited as such, server 30 may control the total of the sum of feed power in power feed group GA and the sum of feed power in power feed group GB to target electric power.

The number of vehicles that constitute power feed group GA may be equal to or different from the number of vehicles that constitute power feed group GB. Timing of start of external power feed in power feed group GA may be identical to or different from timing of start of external power feed in power feed group GB. Electric power P30 and electric power P40 shown in FIG. 18 may be equal to or different from each other. By setting electric power P30 to be lower than electric power P40, power feed group GA may be constituted of vehicles that are unable to feed high power and power feed group GB may be constituted of vehicles that are able to feed high power.

Transmission of the end prediction signal from vehicle 50 to server 30 and transmission of the start signal from server 30 to vehicle 50 are not essential. ECU 150 of each vehicle 50 may determine timing of start of external power feed in accordance with a provisional power feed schedule included in a DR suppression signal. Server 30 can determine whether or not current time is within the overlapping period based on feed power of each vehicle 50. Server 30 may obtain feed power of each vehicle 50 based on a measurement value from a smart meter provided between power grid PG (power network) and each piece of EVSE 40 or based on a measurement value from a wattmeter mounted on each vehicle 50 or each piece of EVSE 40.

The power feed pattern in external power feed by each vehicle 50 that makes up a power feed group is not limited to the trapezoidal power feed pattern shown in FIG. 5 and can be modified as appropriate. Two modifications of the power feed pattern will be described below with reference to FIGS. 19 and 20. The power feed pattern is not limited to the modifications below and any power feed pattern can be adopted.

Figure 19:
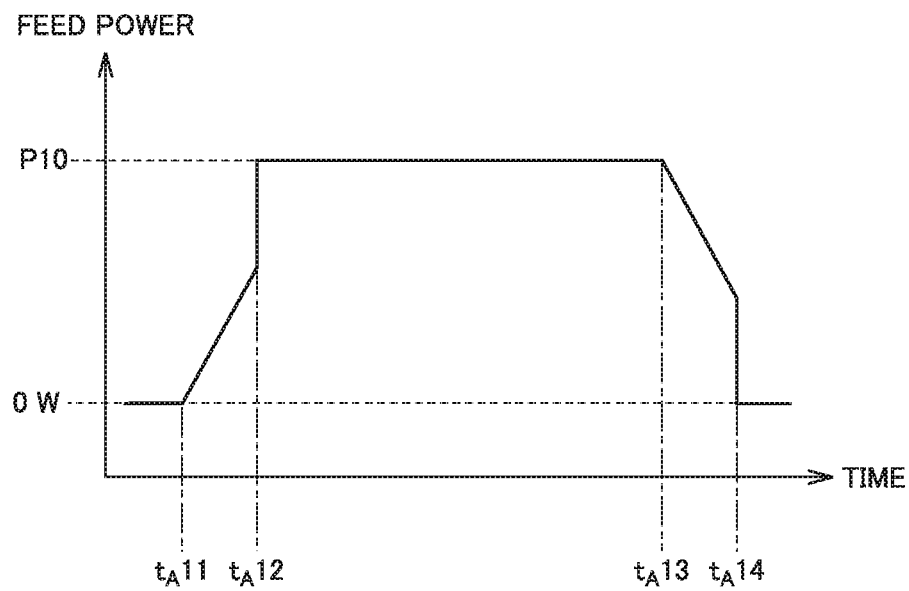
FIG. 19 is a diagram showing a first modification of the power feed pattern shown in FIG. 5.

FIG. 19 is a diagram showing a first modification of the power feed pattern shown in FIG. 5. Referring to FIG. 19, in this power feed pattern, external power feed is started at timing $t_A 11$. When ECU 150 carries out external power feed in accordance with the power feed pattern shown in FIG. 19, immediately after start of power feed, ECU 150 increases feed power at a low rate. Thereafter, when timing $t_A 12$ comes, ECU 150 increases feed power to electric power P10. After feed power attains to electric power P10, ECU 150 keeps feed power at electric power P10. Thereafter, when timing $t_A 13$ comes, ECU 150 decreases feed power at a low rate. When timing $t_A 14$ comes, ECU 150 sets feed power to 0 W and quits external power feed.

Figure 20:
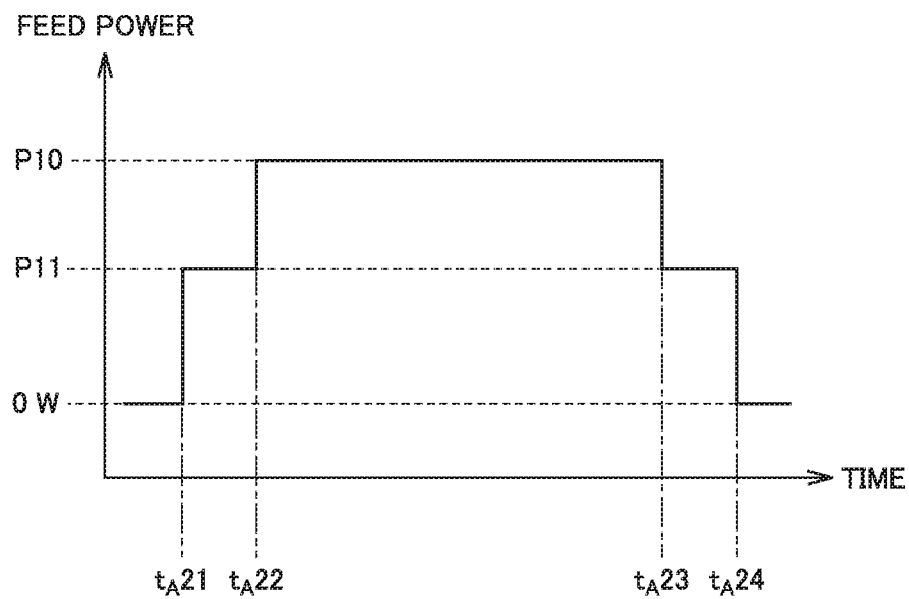
FIG. 20 is a diagram showing a second modification of the power feed pattern shown in FIG. 5.

FIG. 20 is a diagram showing a second modification of the power feed pattern shown in FIG. 5. Referring to FIG. 20, in this power feed pattern, external power feed is started at timing $t_A 21$. When ECU 150 carries out external power feed in accordance with the power feed pattern shown in FIG. 20, ECU 150 increases feed power to electric power P11 immediately after start of power feed. Electric power P11 is lower than electric power P10. Thereafter, when timing $t_A 22$ comes, ECU 150 increases feed power to electric power P10. After feed power attains to electric power P10, ECU 150 keeps feed power at electric power P10. Thereafter, when timing $t_A 23$ comes, ECU 150 decreases feed power to electric power P11. When timing $t_A 24$ comes, ECU 150 sets feed power to 0 W and quits external power feed.

The configuration of the power feed system is not limited to the configuration shown in FIGS. 2 and 3. For example, the electric power utility company may be divided for each business sector. A power generation utility and a power transmission and distribution utility included in the power feed system may belong to companies different from each other. In the embodiment, though an electric power utility company requests an aggregator to participate in DR, the power market may request an aggregator to participate in DR. The aggregator may make a profit by trading in the power market (for example, trading of a capacity or adjustment capability). One piece of EVSE may include a plurality of charging cables. Though a charging facility (EVSE) is used to carry out backfeeding in the embodiment, a facility dedicated for backfeeding may be adopted instead of EVSE.

A configuration of the vehicle included in the power feed system is not limited to the configuration shown in FIG. 1. For example, in the configuration shown in FIG. 1, a power feed apparatus capable only of external power feed may be adopted instead of charger-discharger 120. Each vehicle included in the power feed system may be self-driving.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A power feed system comprising:
a plurality of vehicles each including:
a power storage,
an inlet,
a charger-discharger that is located between the inlet and the power storage, and
an electronic control unit that controls the charger-discharger; and
a server including a power feed controller that controls the plurality of vehicles to successively carry out external power feed in a relayed manner, the external power feed being power feed from the power storage of the vehicle through the charger-discharger and the inlet of the vehicle to a power grid, the power grid being electrically connectable to the inlet of the vehicle, the electronic control unit controls the charger-discharger, in the external power feed, to convert electric power supplied from the power storage into electric power suitable for the external power feed and to output resultant electric power to the inlet,
the plurality of vehicles including a first vehicle and a second vehicle, wherein
in passing on the external power feed in the relayed manner from the first vehicle to the second vehicle, the power feed controller controls the first vehicle and the second vehicle to make transition from the external power feed by the first vehicle to the external power feed by the second vehicle with an overlapping period being interposed, the overlapping period being a period during which both of the first vehicle and the second vehicle simultaneously carry out the external power feed, and
the power feed controller controls at least one of the first vehicle and the second vehicle to set total electric power to target electric power during the overlapping period, the total electric power representing a sum of electric power fed from the first vehicle and electric power fed from the second vehicle.

2. The power feed system according to claim 1, wherein
in passing on the external power feed in the relayed manner from the first vehicle to the second vehicle, the power feed controller decreases electric power fed from the first vehicle at a first rate and increases electric power fed from the second vehicle at a second rate, and
each of the first rate and the second rate is equal to or lower than 3 kW/second on average from start until end of the overlapping period.

3. The power feed system according to claim 1, wherein
when the external power feed in the relayed manner by the first vehicle and the second vehicle does not proceed as scheduled, the power feed controller controls a third vehicle to carry out the external power feed.

4. The power feed system according to claim 3, wherein
when the first vehicle quits the external power feed earlier than scheduled, the power feed controller passes on the external power feed in the relayed manner from the first vehicle to the third vehicle and then to the second vehicle by controlling the third vehicle to carry out the external power feed.

5. The power feed system according to claim 3, comprising an input apparatus that accepts an operation from a user, wherein
when the user performs a prescribed operation onto the input apparatus while the first vehicle is carrying out the external power feed, the first vehicle transmits a prescribed signal to the power feed controller and thereafter stops the external power feed that the first vehicle is carrying out, and
when the power feed controller receives the prescribed signal from the first vehicle, the power feed controller starts the external power feed by the third vehicle before the external power feed that is being carried out by the first vehicle is stopped.

6. The power feed system according to claim 1, wherein
when the first vehicle quits the external power feed earlier than scheduled, the power feed controller passes on the external power feed in the relayed manner from the first vehicle to the second vehicle with the overlapping period being interposed, by starting the external power feed by the second vehicle earlier than scheduled.

7. The power feed system according to claim 1, wherein
the power feed controller controls a length of the overlapping period based on a time period required for the power feed controller to communicate with each of the first vehicle and the second vehicle.

8. The power feed system according to claim 1, wherein
when the power feed controller senses difference of the total electric power from the target electric power during the overlapping period, the power feed controller changes feed power of at least one of the first vehicle and the second vehicle to set the total electric power to the target electric power.

9. The power feed system according to claim 1, wherein
while the power feed controller is carrying out the external power feed in the relayed manner, the power feed controller controls at least one of the plurality of vehicles to set electric power supplied to the power grid to the target electric power and
the target electric power is constant electric power.

10. The power feed system according to claim 1, wherein
the server requests the first vehicle to carry out backfeeding to the power grid by transmitting a demand response signal to the first vehicle,
when the first vehicle receives a first start signal from the server while the first vehicle is electrically connected to the power grid after the first vehicle receives the demand response signal from the server, the first vehicle starts the external power feed in response to the request in the demand response signal,
before the first vehicle quits the started external power feed, the first vehicle transmits a first end prediction signal that predicts end of the started external power feed to the server,
when the server receives the first end prediction signal from the first vehicle, the first vehicle transmits a second start signal to the second vehicle,
when the second vehicle receives the second start signal while the second vehicle is electrically connected to the power grid, the second vehicle starts the external power feed before the external power feed started in the first vehicle ends.

11. The power feed system according to claim 10, wherein
when the server receives a DR execution instruction instructing the server to execute demand response, the server allocates a demand response amount to each vehicle that can address the demand response among the plurality of vehicles, generates the demand response signal for each vehicle, and transmits the demand response signal to each vehicle, and
the target electric power is set to feed power requested in the DR execution instruction.

12. The power feed system according to claim 1, wherein
when the first vehicle receives a first start signal from the server, the charger-discharger of the first vehicle increases feed power from 0 W to the target electric power, keeps feed power at the target electric power for a first prescribed period, and when the first prescribed period elapses, the charger-discharger of the first vehicle lowers feed power to 0 W, and
when the second vehicle receives a second start signal from the server, the charger-discharger of the second vehicle increases feed power from 0 W to the target electric power, keeps feed power at the target electric power for a second prescribed period, and when the second prescribed period elapses, the charger-discharger of the second vehicle lowers feed power to 0 W.

13. The power feed system according to claim 1, wherein
in passing on the external power feed in the relayed manner from the first vehicle to the second vehicle, the charger-discharger of the first vehicle decreases electric power fed from the first vehicle at a first rate and the charger-discharger of the second vehicle increases electric power fed from the second vehicle at a second rate,
the electronic control unit of the first vehicle performs gradual change processing on falling electric power such that the first rate does not exceed a prescribed first value, and
the electronic control unit of the second vehicle performs gradual change processing on rising electric power such that the second rate does not exceed a prescribed second value.

14. The power feed system according to claim 1, wherein
the power feed controller of the server transmits a feed power command to at least one of the first vehicle and the second vehicle during the overlapping period, in response to the feed power command, at least one of the first vehicle and the second vehicle is controlled such that the total electric power attains to the target electric power.

15. The power feed system according to claim 1, wherein
when the electronic control unit receives a feed power command from the server during the overlapping period, the electronic control unit controls feed power in accordance with the feed power command.

16. The power feed system according to claim 15, wherein
each of the plurality of vehicles further including a storage that stores a power feed pattern,
the electronic control unit carries out the external power feed based on the power feed pattern, and
the electronic control unit prioritizes the feed power command from the server over the power feed pattern stored in the storage.

* * * * *